(12) United States Patent
Oh et al.

(10) Patent No.: US 9,201,505 B2
(45) Date of Patent: Dec. 1, 2015

(54) INPUT DEVICE AND IMAGE DISPLAY APPARATUS INCLUDING THE SAME

(75) Inventors: Hyunsook Oh, Seoul (KR); Sungyul An, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/556,435

(22) Filed: Jul. 24, 2012

(65) Prior Publication Data

US 2013/0093728 A1      Apr. 18, 2013

(30) Foreign Application Priority Data

Oct. 13, 2011     (KR) .................... 10-2011-0104729

(51) Int. Cl.
  *G06F 3/01*      (2006.01)
  *G06F 3/0354*    (2013.01)

(52) U.S. Cl.
  CPC ............ *G06F 3/016* (2013.01); *G06F 3/03547* (2013.01); *G06F 2203/04106* (2013.01)

(58) Field of Classification Search
  CPC ...... G02B 6/068; G02B 6/0073; G02B 6/006; G02B 6/0066; G06F 3/016; G06F 3/03457; G06F 2203/04106
  See application file for complete search history.

(56) References Cited

U.S. PATENT DOCUMENTS

| | | | |
|---|---|---|---|
| 2006/0030954 A1* | 2/2006 | Bergman et al. | ................ 700/19 |
| 2010/0245289 A1* | 9/2010 | Svajda | .......................... 345/175 |
| 2010/0259485 A1* | 10/2010 | Chuang | ........................ 345/173 |
| 2010/0302799 A1* | 12/2010 | Rosberg et al. | .............. 362/602 |
| 2011/0109577 A1* | 5/2011 | Lee et al. | ...................... 345/173 |

* cited by examiner

*Primary Examiner* — Latanya Bibbins
(74) *Attorney, Agent, or Firm* — KED & Associates, LLP

(57) ABSTRACT

An input device and an image display apparatus including the same are disclosed. The input device includes first and second light source units arranged spaced apart from each other and configured to respectively output first light having a first color and second light having a second color, a light guide having a circular shape and configured to receive the first light and the second light, synthesize the first light and the second light and output third synthesized light, a touch sensor configured to detect touch input, and a light source controller configured to control the third light output from the light guide based on touch input detected by the touch sensor. Accordingly, it is possible to improve user convenience.

14 Claims, 27 Drawing Sheets

FIG. 25
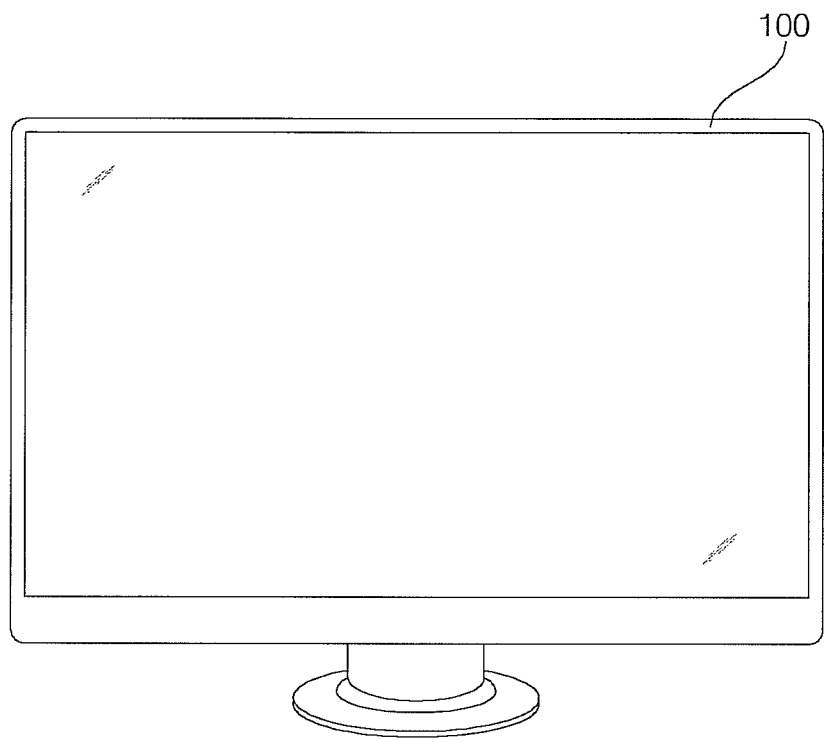
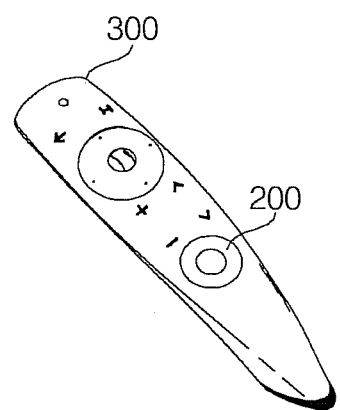

INPUT DEVICE AND IMAGE DISPLAY APPARATUS INCLUDING THE SAME

CROSS-REFERENCE TO RELATED APPLICATION

This application claims the priority benefit of Korean Patent Application No. 10-2011-0104729, filed on Oct. 13, 2011 in the Korean Intellectual Property Office, the disclosure of which is incorporated herein by reference.

BACKGROUND OF THE INVENTION

1. Field of the Invention

The present invention relates to an input device and an image display apparatus including the same and, more particularly, to an input device able to improve user convenience and an image display apparatus including the same.

2. Description of the Related Art

An image display apparatus has a function for displaying an image to a user and a function for outputting an audio signal.

In the image display apparatus, an input device is used to output a video or audio signal desired by a user or perform other setting functions.

SUMMARY OF THE INVENTION

Therefore, the present invention has been made in view of the above problems, and it is an object of the present invention to provide an input device able to improve user convenience and an image display apparatus including the same.

It is another object of the present invention to provide an input device able to provide interactivity during input and an image display apparatus including the same.

In accordance with an aspect of the present invention, the above and other objects can be accomplished by the provision of an input device including first and second light source units arranged spaced apart from each other and configured to respectively output first light having a first color and second light having a second color, a light guide having a circular shape and configured to receive the first light and the second light, synthesize the first light and the second light and output third synthesized light, a touch sensor configured to detect touch input, and a light source controller configured to control the third light output from the light guide based on touch input detected by the touch sensor.

In accordance with another aspect of the present invention, there is provided an input device including first and second light source units arranged spaced apart from each other and configured to respectively output first light having a first color and second light having a second color, a light guide having a circular shape and configured to receive the first light and the second light, synthesize the first light and the second light and output third synthesized light, a touch sensor configured to detect touch input, and a light source controller configured to change the first light output from the first light source unit or the second light output from the second light source unit according to touch input detected by the touch sensor.

In accordance with a further aspect of the present invention, there is provided an image display apparatus including a display configured to display an image, an input device including first and second light source units arranged spaced apart from each other and configured to respectively output first light having a first color and second light having a second color, a light guide having a circular shape and configured to receive the first light and the second light, synthesize the first light and the second light and output third synthesized light and a touch sensor configured to detect touch input, the input device being configured to change and output at least one of the first light output from the first light source unit or the second light output from the second light source unit, and a controller configured to control an operation corresponding to touch input.

BRIEF DESCRIPTION OF THE DRAWINGS

The above and other objects, features and other advantages of the present invention will be more clearly understood from the following detailed description taken in conjunction with the accompanying drawings, in which:

FIG. 25 is a diagram showing a remote controller including an input device according to another embodiment of the present invention;

DETAILED DESCRIPTION OF THE PREFERRED EMBODIMENTS

Exemplary embodiments of the present invention will be described with reference to the attached drawings.

The terms "module" and "unit" attached to describe the names of components are used herein to help the understanding of the components and thus they should not be considered as having specific meanings or roles. Accordingly, the terms "module" and "unit" may be used interchangeably.

Figure 1:
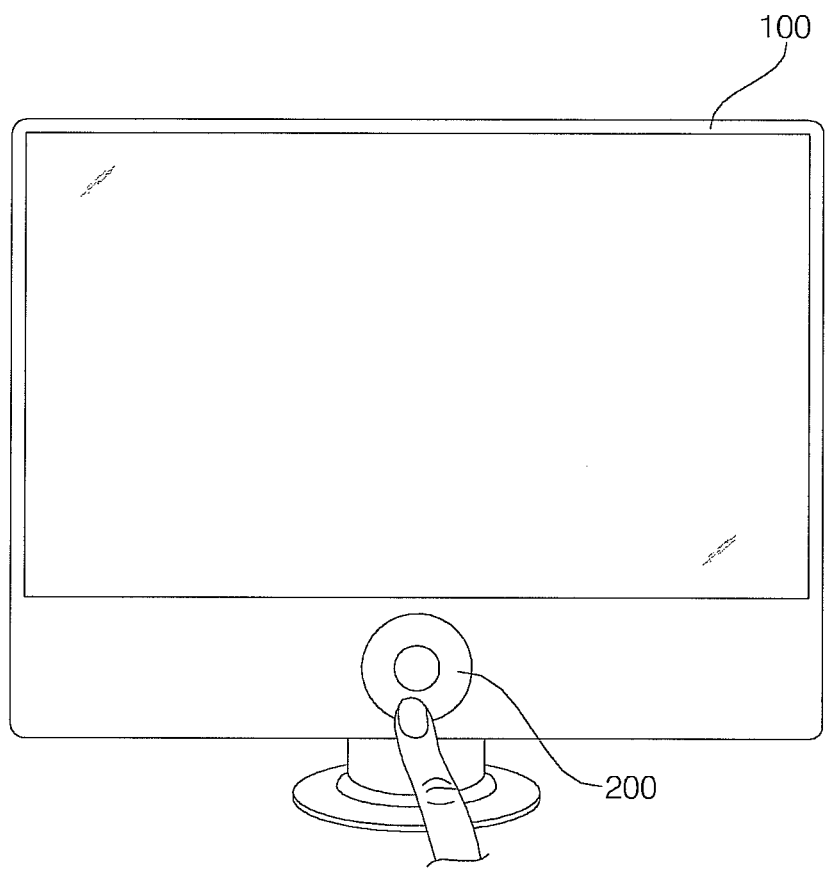
FIG. 1 is a diagram showing an image display apparatus including an input device according to an embodiment of the present invention.

FIG. 1 is a diagram showing an image display apparatus including an input device according to an embodiment of the present invention.

Referring to FIG. 1, the input device 200 according to the embodiment of the present invention may be included in the image display apparatus 100.

In FIG. 1, the input device 200 is arranged in at least a part of a bezel area surrounding a display 180 of the image display apparatus 100.

The input device 200 according to the embodiment of the present invention includes a circular light guide and a plurality of light source units. The input device synthesizes light emitted from the light source units and outputs the synthesized light through the light guide in a circular shape. In particular, if user touch input is performed with respect to the input device 200, the light emitted from each light source unit is changed in correspondence with touch information of touch input.

For example, the amount of light emitted from at least one light source unit may be changed according to touch position information of the touch information. Therefore, it is possible to provide interactivity in correspondence with touch input.

As another example, the amount of light emitted from at least one light source unit may be changed according to touch number information, touch strength information, touch distance information or touch duration information of touch information. As another example, the color of light emitted from at least one light source unit may be changed according to touch number information, touch strength information, touch distance information or touch duration information of the touch information. Therefore, it is possible to provide interactivity in correspondence with touch input.

The input device 200 may include a plurality of input keys (not shown) for performing various input operations. The plurality of input keys may be displayed on a board of the input device 200 by a printing method, etc. Touch input positions may correspond to the plurality of input keys. Therefore, different input operations may be performed according to touch input positions.

The operation of the input device will now be described.

The image display apparatus described in the present specification may include a TV receiver, a mobile phone, a smart phone, a notebook computer, a digital broadcast terminal, a Personal Digital Assistant (PDA), an MP3 player, a Portable Multimedia Player (PMP), an e-book, etc.

That is, the input device 200 according to the embodiment of the present invention is applicable to various image display apparatuses, as described above. The input device 200 is applicable to electronic apparatuses such as a washing machine, a refrigerator, an air conditioner, a cooker, a cleaner or an electric iron.

Figure 2:
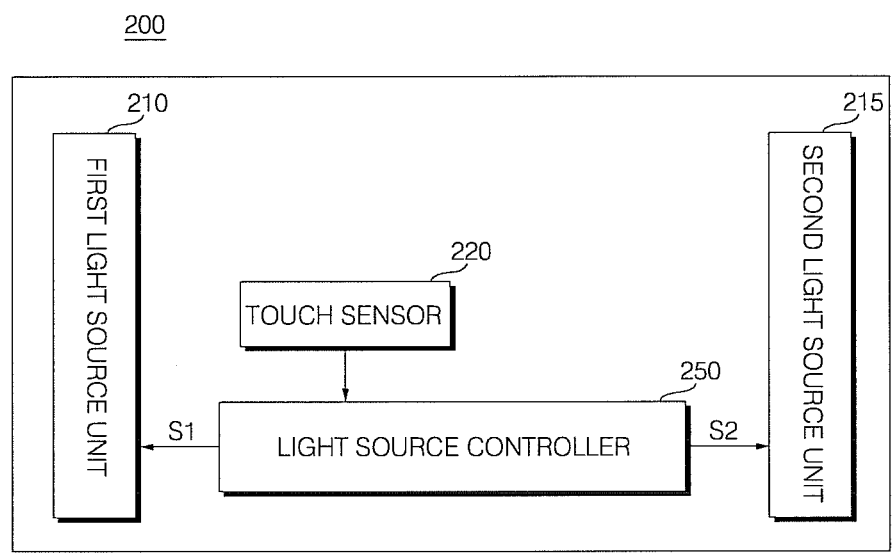
FIG. 2 is a block diagram showing an example of the input device of FIG. 1.

FIG. 2 is a block diagram showing an example of the input device of FIG. 1.

Referring to FIG. 2, the input device 200 according to the embodiment of the present invention includes a board 205, a first light source unit 210, a second light source unit 215, a touch sensor 220, a light guide 230, and a light source controller 250.

The first light source unit 210 and the second light source unit 215 are arranged spaced apart from each other and may emit respective light. The first light source unit 210 and the second light source unit 215 may emit light having the same color or different colors. Hereinafter, for convenience, it is assumed that the first light source unit 210 and the second light source unit 215 emit light having different colors.

The light guide 230 synthesizes the light emitted from the first light source unit 210 and the light emitted from the second light source unit 215 and outputs the synthesized light. More specifically, the light guide 230 may have a circular shape or may have patterns arranged in a circular shape to synthesize light emitted from the light source units and output the synthesized light through the light guide in a circular shape.

The light guide 230 may include at least one of a first direction pattern from the first light source unit 210 to the second light source unit 215 or a second direction pattern from the second light source unit 215 to the first light source unit 210.

Such direction patterns may be formed in any one of a plurality of light guide layers. Alternatively, the first direction pattern may be formed in a first light guide layer 203a and the second direction pattern may be formed in a second light layer 230b.

When touch input is moved from the first light source unit 210 to the second light source unit 215, the amount of synthesized light is changed and the directivity of the light is increased, which will be described below with reference to FIG. 20.

The touch sensor 220 detects touch input. The detected touch information is sent to the light source controller 250. The detected touch information may include touch position information, touch number information, touch strength information, touch distance information or touch duration information.

Figure 4:
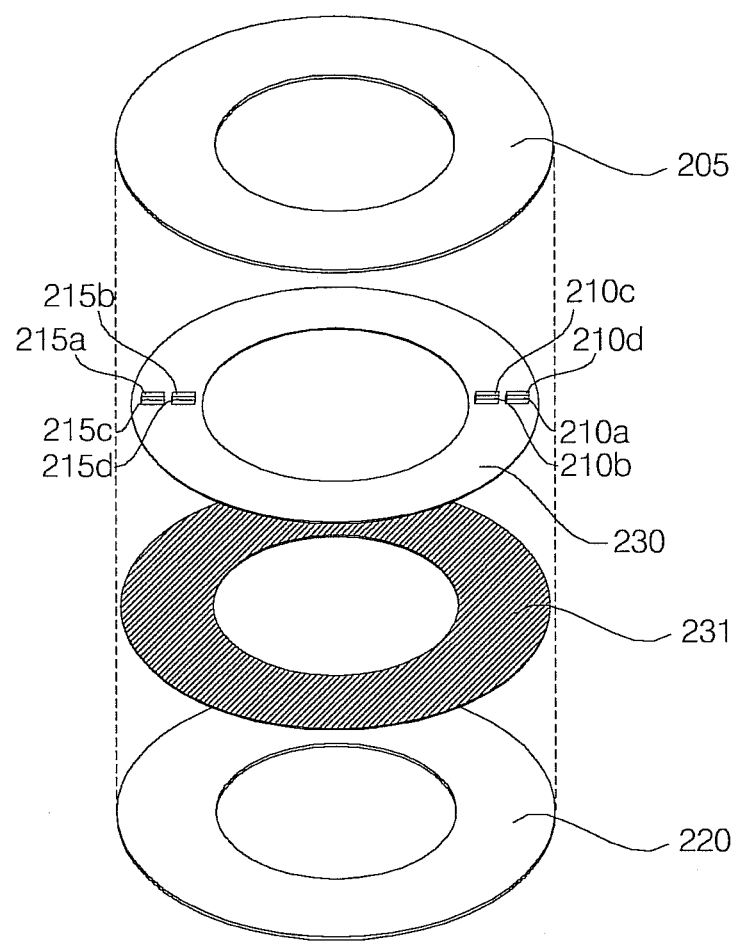
FIG. 4 is an exploded perspective view showing an example of the structure of the input device of FIG. 1.
Figure 6:
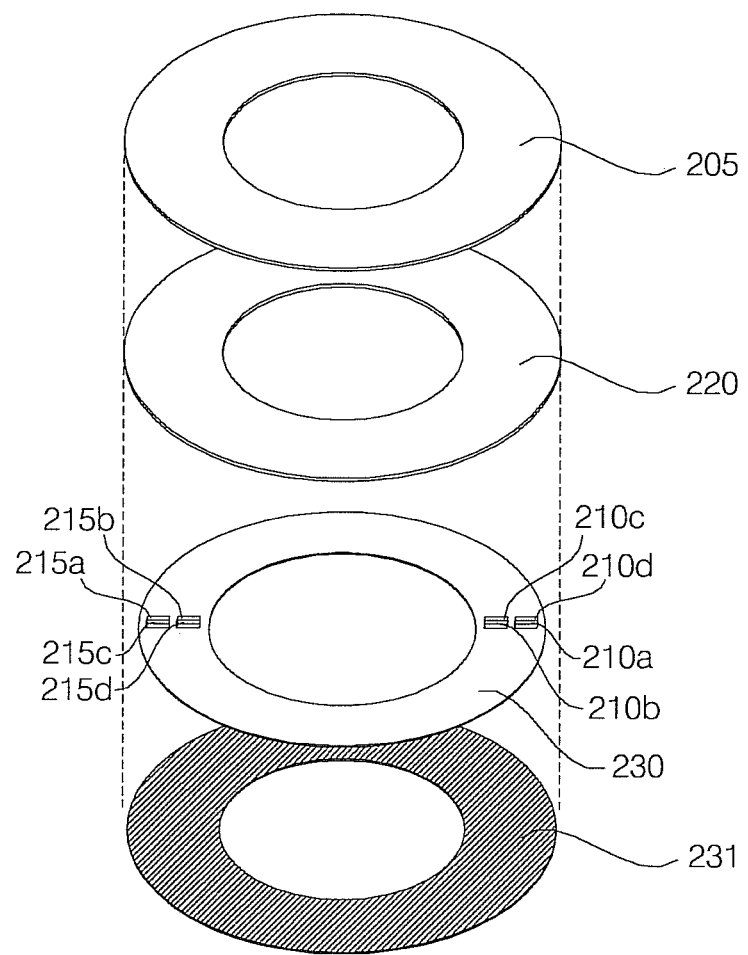
FIG. 6 is an exploded perspective view showing another example of the structure of the input device of FIG. 1.

The touch sensor 220 may be implemented using various methods such as a capacitive method or a static pressure method, in order to detect the user touch input. FIG. 4 shows a static pressure touch sensor and FIG. 6 shows a capacitive touch sensor.

The light source controller 250 controls the first light source unit 210 and the second light source unit 215. In particular, at least one of a first electrical signal S1 sent to the first light source unit 210 or a second electrical signal S2 sent to the second light source unit 215 is changed according to the touch information detected by the touch sensor 220.

For example, the light source controller 250 may increase the level or pulse width of the first electrical signal S1 and/or decrease the level or pulse width of the second electrical signal S2, as the touch position information of the touch information detected by the touch sensor 220 becomes closer to the second light source unit 215 than the first light source unit 210.

That is, the light source controller 250 may control increase in the amount of light emitted from the first light source unit 210 and/or decrease in the amount of light emitted from the second light source unit 215, as the touch position information of the touch information detected by the touch sensor 220 becomes closer to the second light source unit 215 than the first light source unit 210. By changing the amount of light in this way, the user can perceive interactivity corresponding to touch input.

The light source controller 250 may change the amount of the light emitted from the first light source unit and the amount of light emitted from the second light source unit in inverse proportion to each other according to the touch position information of the touch information.

The light source controller 250 may change the level, pulse width or period of the first electrical signal S1 and/or the level, pulse width or period of the second electrical signal S2, according to the touch number information, touch strength information, touch distance information or touch duration information of the touch information detected by the touch sensor 220.

For example, the light source controller 250 may further increase the level or pulse width of the first electrical signal S1 and/or further decrease the level or pulse width of the second electrical signal S2, when the number of times of touch, touch strength, touch distance or touch duration is increased in a state in which the touch position information of the detected touch information becomes closer to the second light source unit 215 than the first light source unit 210.

That is, the light source controller 250 may control increase in the amount of light emitted from the first light source unit 210 and/or decrease in the amount of light emitted from the second light source unit 215.

In particular, if the number of times of touch, touch strength, touch distance or touch duration is increased, the light source controller 250 may control further increase in the amount of light emitted from the first light source unit 210 and/or further decrease in the amount of light emitted from the second light source unit 215. By changing the amount of light in this way, the user can perceive interactivity corresponding to touch input.

As another example, the light source controller 250 may change at least one of the period of the first electrical signal S1 or the period of the second electrical signal S2, when the number of times of touch, touch strength, touch distance or touch duration of the detected touch information is changed.

That is, the color of the light emitted from the first light source unit 210 and/or the color of the light emitted from the second light source unit 215 may be changed. By changing the color of the light, the user can perceive interactivity corresponding to touch input.

The light source controller 250 may classify the touch information detected by the touch sensor 220 into touch position information, touch number information, touch strength information, touch distance information and touch duration information.

For example, the position information may be acquired based on a touch position information signal, the level of which is changed, among touch information signals detected by the touch sensor 220 or the touch number information, the touch strength information, the touch distance information or the touch duration information may be acquired according to the number of pulses of the touch information signals detected by the touch sensor 220.

Figure 3:
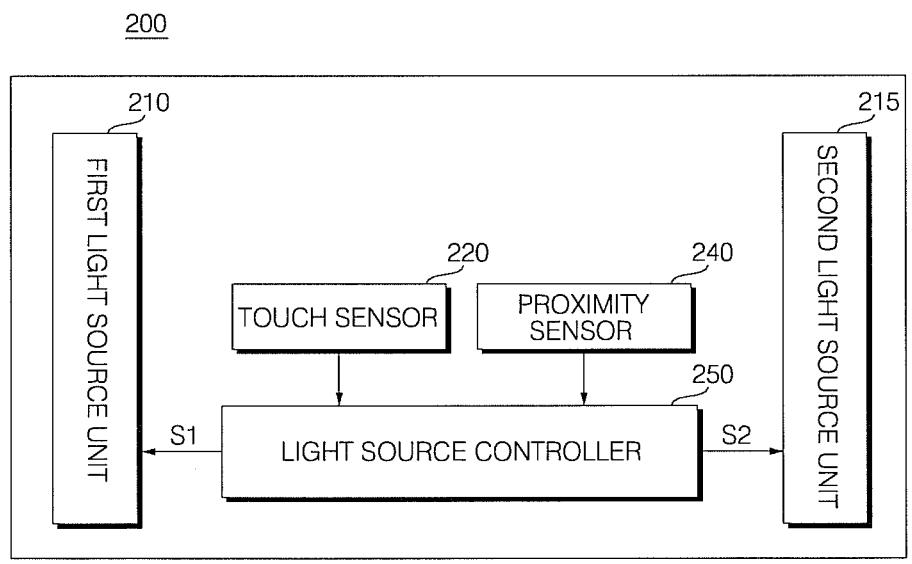
FIG. 3 is a block diagram showing another example of the input device of FIG. 1.

FIG. 3 is a block diagram showing another example of the input device of FIG. 1.

Referring to FIG. 3, the input device of FIG. 3 is different from the input device of FIG. 2 in that a proximity sensor 240 is further included. Hereinafter, only this difference will be described.

The proximity sensor 240 detects a user's finger which approaches the input device within a predetermined range and may be implemented using a sensor using light (photosensor, etc.), a high-frequency oscillator circuit, etc. The detected signal is sent to the light source controller 250.

The light source controller 250 may control emission of light from at least one of the first light source unit 210 or the second light source unit 215, if it is determined that a user approaches the input device within a predetermined range.

That is, if the user does not approach the input device within the predetermined range, in order to reduce power consumption, the first light source unit 210 and the second light source unit 215 are in an idle state in which light is not emitted. Then, when the proximity sensor 240 detects that the user approaches the input device within the predetermined range, at least one of the first light source unit 210 and the second light source unit 215 emits light. Thereafter, the user may perform a touch input operation in a state in which the first light source unit 210 or the second light source unit 215 is activated.

Meanwhile, the input device 200 may further include a setting unit (not shown) to perform a setting of time or temperature based on touch input detected by the touch sensor.

The setting unit (not shown) may perform a setting of operation time or operation temperature of an electronic apparatus including the input device 200 according to at least one of position information of touch input, the number of times of touch input, a duration of touch input, a moving distance of touch input and a strength of touch input.

For example, the setting unit (not shown) may perform increase the level of the operation time or operation temperature, when the number of times of touch, touch strength, touch distance or touch duration is increased in a state in which the touch position information of the detected touch information becomes closer to the second light source unit 215 than the first light source unit 210.

Figure 5:
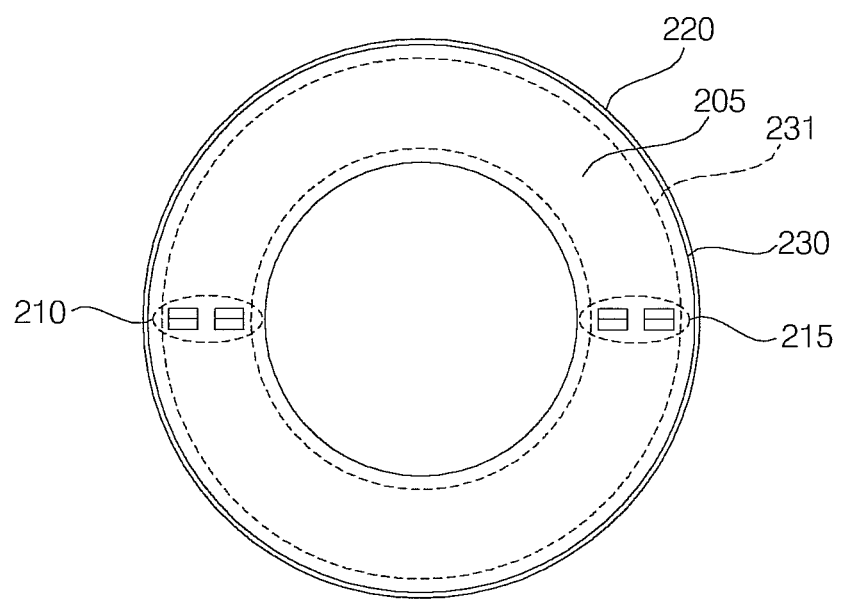
FIG. 5 is a diagram showing an example of a coupling structure of the input device of FIG. 1.

FIG. 4 is an exploded perspective view showing an example of the structure of the input device of FIG. 1, and FIG. 5 is a diagram showing an example of a coupling structure of the input device of FIG. 1.

Referring to FIGS. 4 and 5, the first light source unit 210 and the second light source unit 215 may be provided at both sides of the touch sensor 220, which may be implemented by a printed circuit board (PCB), to be arranged spaced apart from each other. The touch sensor 220 may have a circular shape.

The first light source unit 210 may emit a first light having a predetermined color. The second light source unit 215 may emit a second light having a color different from that of the light emitted from the first light source unit 210.

Each of the light source units 210 and 215 may include a plurality of light sources for emitting light. For example, a light emitting diode (LED) may be used as a light source. The LED may be an inorganic LED or an organic LED.

The first light source unit 210 and the second light source unit 215 may include a plurality of light sources for emitting light having different colors, respectively. The light source units 210 and 215 may emit light having different colors according to conditions.

In FIG. 4, the first light source unit 210 includes a plurality of light sources 210a, 210b, 210c and 210d for emitting red (R) light and the second light source unit 215 includes a plurality of light sources 215a, 215b, 215c and 215d for emitting green (G) light. As another example, the first light source unit 210 may emit blue (B) light and the second light source unit 215 may emit white (B) light.

Hereinafter, for convenience of description, it is assumed that the first light source unit 210 emits the red (R) light and the second light source unit 215 emits the green (G) light.

The touch sensor 220 may be disposed below the circular light guide 230. That is, the circular light guide 230 may be disposed below a circular board 205 and a circular touch sensor 220 may be disposed below the circular light guide 230. In particular, the first light source unit 210 and the second light source unit 215 may be disposed at both sides of the touch sensor 220.

The touch sensor 220 of FIG. 4 may be implemented by a static pressure method, in order to detect user touch input. Touch information detected by the touch sensor 220 is sent to the light source controller 250.

The light guide 230 has a circular shape or has patterns arranged in a circular shape. The light guide 230 may synthesize the light emitted from the first light source unit 210 and the second light source unit 215 and output the synthesized light through the light guide 230 in a circular shape.

The light guide 230 couples the first light source unit 210 and the second light source unit 215 to holes respectively corresponding to the first light source unit 210 and the second light source unit 215, directs the light of the first light source unit 210 to the second light source unit 215, and directs the light of the second light source unit 215 to the first light source unit 210.

FIG. 4 shows the case where the light guide 230 is disposed between the board 205 and the touch sensor 220 having the plurality of light source units 210 and 215 attached thereto. In particular, insertion holes may be formed in the light guide 230 so as to insert the red light sources 210a, 210b, 210c and 210d and the green light sources 215a, 215b, 215c and 215d provided on both sides of the touch sensor 220 thereinto.

A reflective layer 231 may be disposed between the light guide 230 and the touch sensor 220 such that the synchronized light output from the light guide 230 is not directed to the touch sensor 220. By this reflective layer 231, the light synthesized by the light guide 230 may be output toward the board 205.

The light guide 230 may include at least one of a first direction pattern from the first light source unit 210 to the second light source unit 215 or a second direction pattern from the second light source unit 215 to the first light source unit 210. When touch input is moved from the first light source unit 210 to the second light source unit 215, the amount of synthesized light is changed and the directivity of the light is improved, which will be described below with reference to FIG. 20.

FIG. 5 shows the appearance of the input device 200 in which the circular board 205, the light guide 230 and the touch sensor 230 are sequentially coupled, as shown in FIG. 4. The input device 200 may be implemented in the form of a module having a circular shape. The light source controller 250 and the proximity sensor 240 may be disposed on a rear surface of the touch sensor 230 implemented by a PCB.

The board 205 transmits and outputs the light synthesized by the light guide 230. For light transmission and output, the board 205 may be formed of a transparent material. For example, the board 205 may be formed of glass or a transparent film.

A plurality of input keys may be displayed on the board 205. For example, a plurality of input keys such as INPUT, MENU, −VOL, VOL+, −CH, CH+ and POWER may be displayed. More specifically, a plurality of input keys may be displayed on the transparent board 205 by a printing method, etc.

The input keys displayed on the board 205 are preferably displayed so as to be easily recognized from the synthesized light. The input keys displayed on the board may be variously changed.

As the touch input position becomes closer to the second light source units 215 than the first light source unit 210, the amount of light emitted from the first light source unit 210 is increased to be greater than the amount of light emitted from the second light source unit 215. Therefore, when the touch input position is moved, it is possible to provide a moving effect.

On the contrary to the above-described example, the light source controller 250 may further decrease the amount of light emitted from the first light source unit 210 or further increase the amount of light emitted from the second light source unit 215, as the touch input position becomes closer to the second light source unit 215 than the first light source unit 210. Therefore, when the touch input position is moved, it is possible to provide a moving effect.

FIG. 6 is an exploded perspective view showing another example of the structure of the input device of FIG. 1.

Referring to FIG. 6, the structure of the input device of FIG. 6 is similar to that of the input device of FIG. 4, except that touch sensor 220 is disposed between the board 205 and the light guide 230, unlike FIG. 4 in which the touch sensor 220 is disposed on the bottom of the input device. The reflective layer 231 may be attached to the rear surface of the light guide 230.

The touch sensor 220 may be a capacitive touch sensor. The touch information detected by the touch sensor 220 is sent to the light source controller 240.

Unlike FIGS. 4 and 6, the position of the touch sensor 220 may be variously changed.

Figure 7:
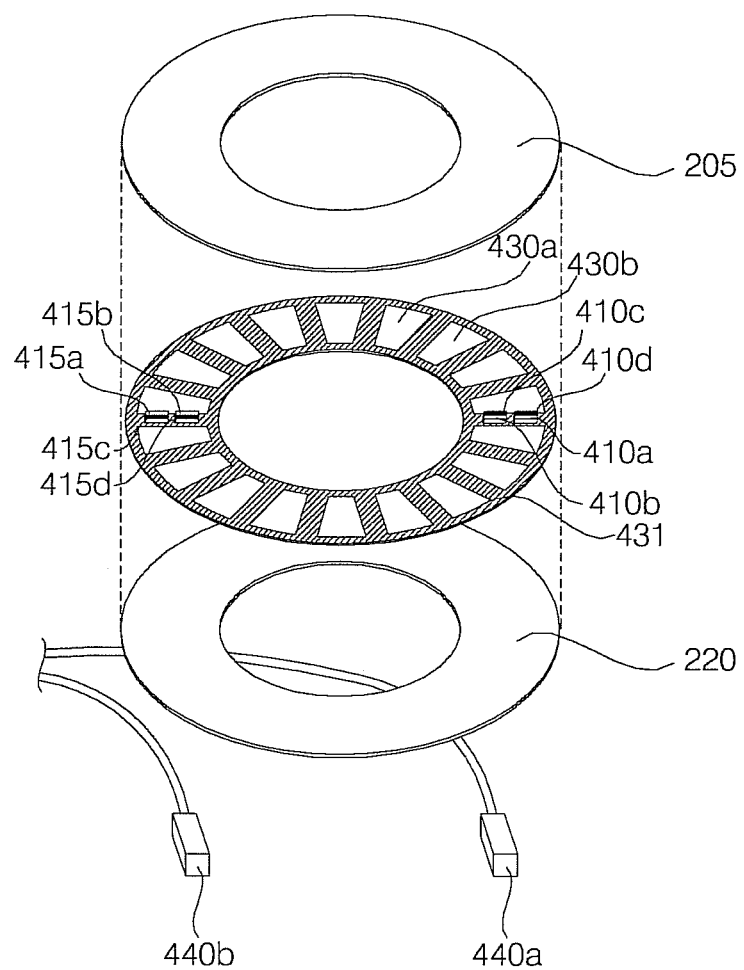
FIG. 7 is an exploded perspective view showing another example of the structure of the input device of FIG. 1.
Figure 8:
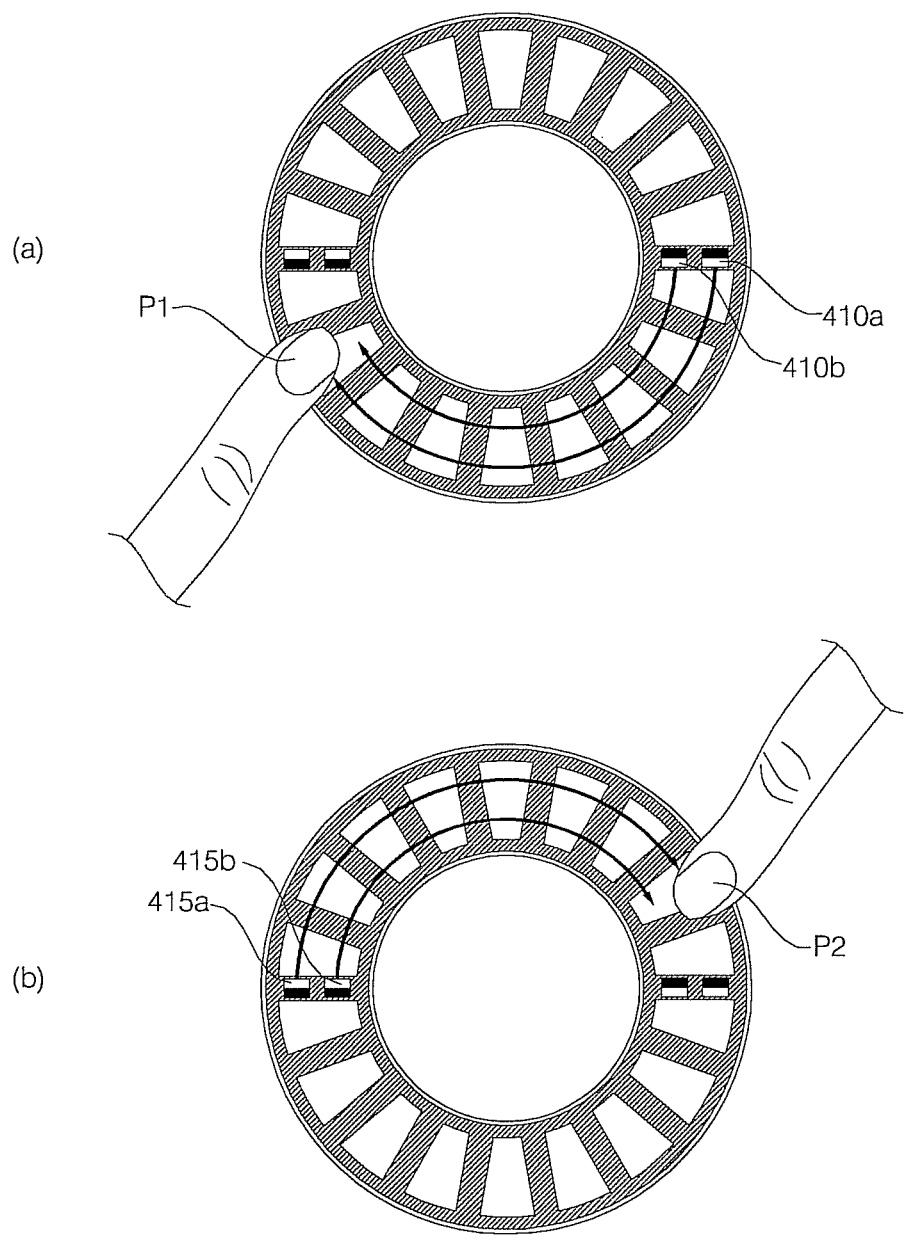
FIG. 8 is a diagram illustrating an operation of the input device of FIG. 7.

FIG. 7 is an exploded perspective view showing another example of the structure of the input device of FIG. 1, and FIG. 8 is a diagram illustrating an operation of the input device of FIG. 7.

Referring to FIGS. 7 and 8, the structure of the input device of FIG. 7 is similar to the structure of the input device of FIG. 4 except that a light guide 430 includes a plurality of light guide patterns 430a, 430b, . . . .

While the light guide 230 of FIG. 4 is of an integral type and has a circular shape, the plurality of light guide patterns 430a, 430b, . . . of the light guide 430 of FIG. 7 has an arc shape and is arranged on a circular reflective layer 431 in a circular shape. Since the light guide patterns of the light guide 430 are arranged in a circular shape, the light emitted from the light source units 410 and 415 are synthesized and the light synthesized through the light guide 430 is output in a circular shape.

The first light source unit 410 of FIG. 7 may include a plurality of light sources 410a and 410b and a plurality of light source reflectors 410c and 410d for enabling the light sources to emit light in a first direction (downward direction) and preventing the light sources from emitting light in a second direction (upward direction) opposite to the first direction (downward direction).

The second light source unit 415 of FIG. 7 may include a plurality of light sources 415a and 415b and a plurality of light source reflectors 415c and 415d for enabling the light sources to emit light in a second direction (upward direction) and preventing the light sources from emitting light in a first direction (downward direction) opposite to the second direction (upward direction).

The input device of FIG. 7 may further include haptic modules 440a and 440b. The haptic unit 440a and 440b may perform a vibration operation based on touch input detected by the touch sensor 220. For example, the intensity of vibrations output from the haptic units 440a and 440b may be changed according to touch input positions. By using the haptic units 440a and 440b, it is possible to variously implement feedbacks according to user touch input.

FIG. 8(a) shows a state in which light is emitted only from the first light source unit 410 between the first light source unit 410 and the second light source unit 415 if a user touches a first point P1 of a lower region of an input device using the input device of FIG. 7. The light source controller 250 may control emission of light only from the first light source units 410 between the first light source unit 410 and the second light source unit 415. The emitted light may be guided through the plurality of light guide patterns 430a, 430b, . . . in a circular shape and transmitted to the vicinity of the second light source unit 415 to be output.

FIG. 8(b) shows a state in which light is emitted only from the second light source unit 415 between the first light source unit 410 and the second light source unit 415 if a user touches a second point P2 of an upper region of an input device using the input device of FIG. 7. The light source controller 250 may control emission of light only from the second light source units 415 between the first light source unit 410 and the second light source unit 415. The emitted light may be guided through the plurality of light guide patterns 430a, 430b, ... in a circular shape and transmitted to the vicinity of the first light source unit 410 to be output.

Figure 9:
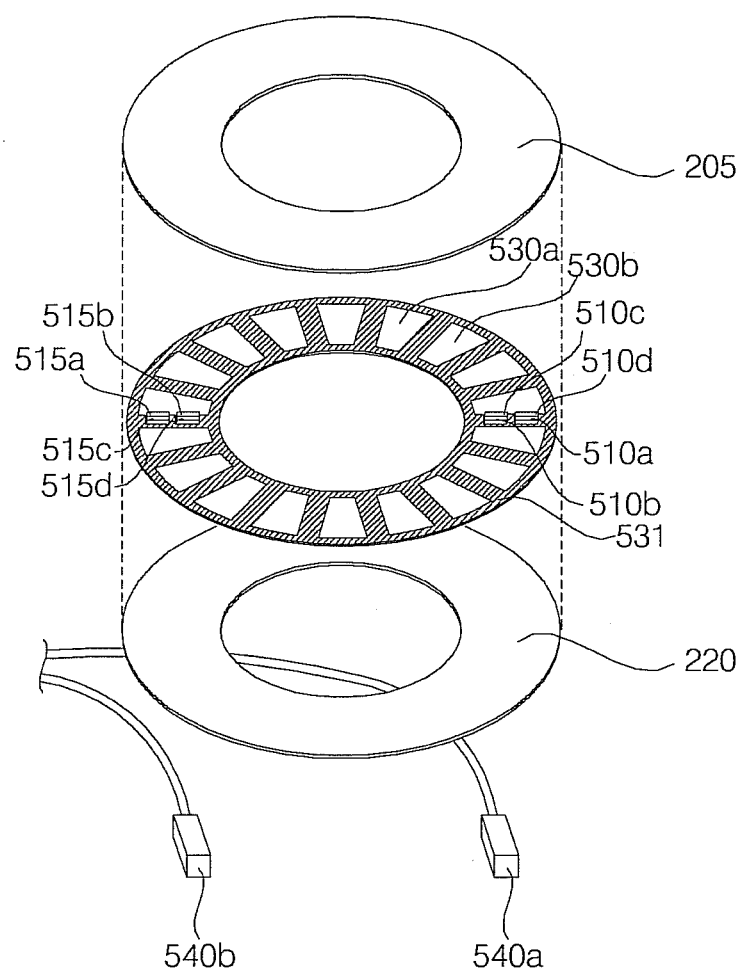
FIG. 9 is an exploded perspective view showing another example of the structure of the input device of FIG. 1.
Figure 10:
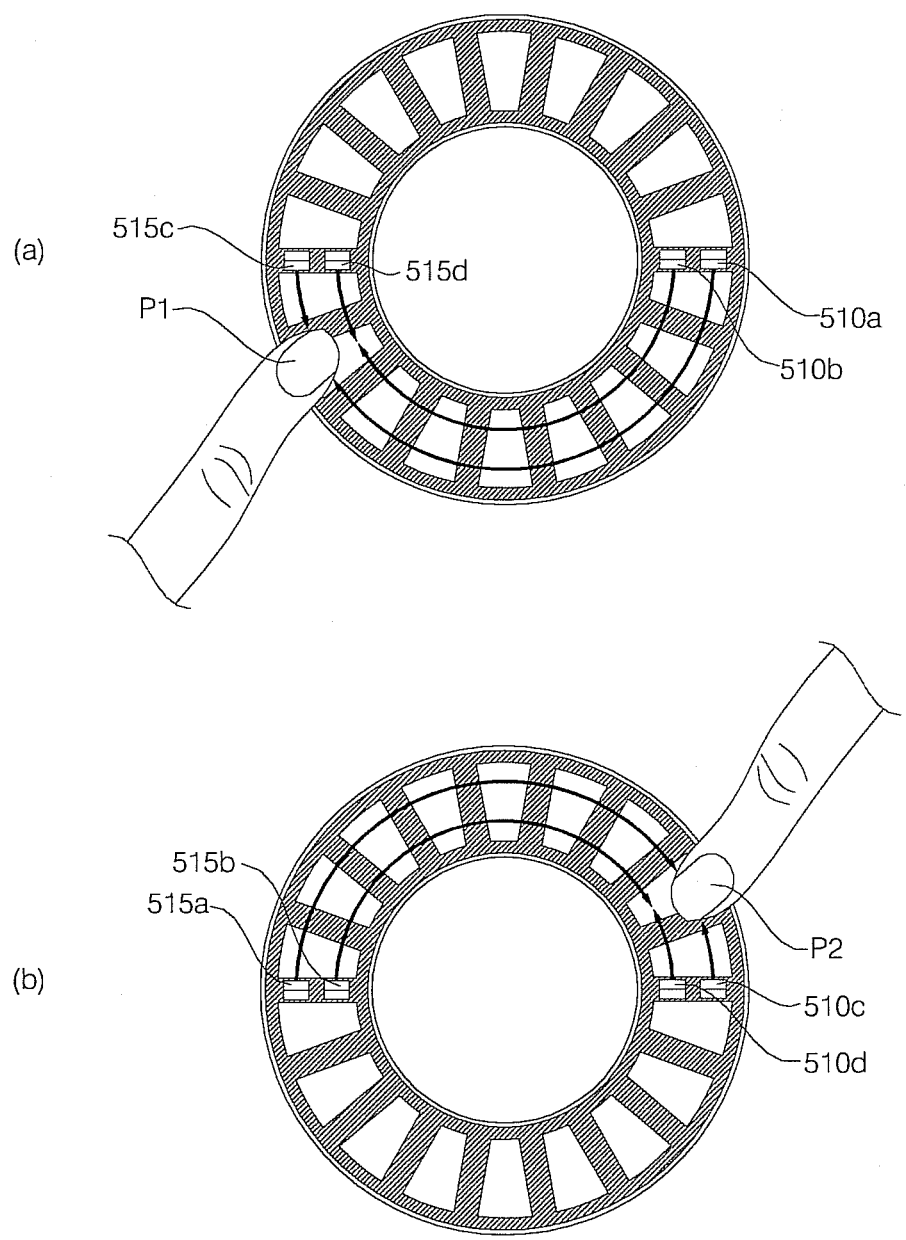
FIG. 10 is a diagram showing an operation of the input device of FIG. 9.

FIG. 9 is an exploded perspective view showing another example of the structure of the input device of FIG. 1, and FIG. 10 is a diagram showing an operation of the input device of FIG. 9.

Referring to FIGS. 9 and 10, the structure of the input device of FIG. 9 is similar to the structure of the input device of FIG. 7 in that a light guide 530 has a plurality of light guide patterns 530a, 530b, .... Since the light guide patterns of the light guide 530 are arranged in a circular shape, the light emitted from the light source units 510 and 515 may be synthesized and the light synthesized through the light guide 530 may be output in a circular shape.

The input device of FIG. 9 is different from the input device of FIG. 7 in that light sources are provided instead of the light source reflectors.

The first light source unit 510 of FIG. 9 includes a plurality of light sources 510a and 510b for emitting light in a first direction (downward direction) and a plurality of light sources 510c and 510d for emitting light in a second direction (upward direction).

The second light source units 515 of FIG. 9 includes a plurality of light sources 515a and 515b for emitting light in a second direction (upward direction) and a plurality of light sources 515c and 515d for emitting light in a first direction (downward direction).

The input device of FIG. 9 may further include haptic units 540a and 540b similarly to FIG. 7.

FIG. 10(a) shows a state in which light is emitted from both the first light source unit 510 and the second light source unit 515 if a user touches a first point P1 of a lower region of an input device using the input device of FIG. 9.

The light source controller 250 may control light emission such that the amount of light from the first light source unit 510 and the amount of light from the second light source unit 515 are inversely proportional to each other according to touch input positions. In particular, the light source controller 250 may turn some light sources 510a and 510b of the first light source unit 510 on so as to emit light in a downward direction and turn some light sources 515c and 515d of the second light source unit 515 on so as to emit light in a downward direction.

The light emitted from the first light source unit 510 and the light emitted from the second light source unit 515 may be guided through the plurality of light guide patterns 530a, 530b, ... in a circular shape and may be synthesized in the vicinity of the first point P1 to be output.

FIG. 10(b) shows a state in which light is emitted from both the first light source unit 510 and the second light source unit 515 if a user touches a second point P2 of an upper region of an input device using the input device of FIG. 9.

The light source controller 250 may control light emission such that the amount of light from the first light source unit 510 and the amount of light from the second light source unit 515 are inversely proportional to each other according to touch input positions. In particular, the light source controller 250 may turn some light sources 510c and 510d of the first light source unit 510 on so as to emit light in an upward direction and turn some light sources 515a and 515b of the second light source unit 515 on so as to emit light in an upward direction.

The light emitted from the first light source unit 510 and the light emitted from the second light source unit 515 may be guided through the plurality of light guide patterns 530a, 530b, ... in a circular shape and may be synthesized in the vicinity of the second point P2 to be output.

Although the color of the light emitted from the first light source unit 510 and the color of the light emitted from the second light source unit 515 are the same in FIGS. 10(a) and 10(b), various modifications thereof are possible.

For example, the light source controller 250 may control the first light source unit 510 and the second light source unit 515 such that the first light source unit 510 and the second light source unit 515 emit light having different colors according to positions, when touching the first point P1 and the second point P2 which are opposite to each other with respect to an extension of the first light source unit 510 and the second light source unit 515.

More specifically, as shown in FIG. 10(a), when a user touches the first point P1 of the lower region of the input device, the first light source unit 510 may emit red (R) light and the second light source units 515 may emit green (G) light. As shown in FIG. 10(b), when a user touches the second point P2 of the upper region of the input device, the first light source unit 510 may emit green (G) light and the second light source units 515 may emit blue (B) light.

The first and second light sources 510a and 510b for emitting light in the downward direction of the first light source unit 510 may be red light sources and the third and fourth light sources 510c and 510d for emitting light in the upward direction may be green light sources. In addition, the third and fourth light sources 515c and 515d for emitting light in the downward direction of the second light source unit 515 may be green light sources and the first and second light sources 515a and 515b for emitting light in the upward direction may be blue light sources.

FIGS. 11 to 17 are diagrams showing various examples of light display according to a touch input position of the input device of FIG. 1.

Figure 11:
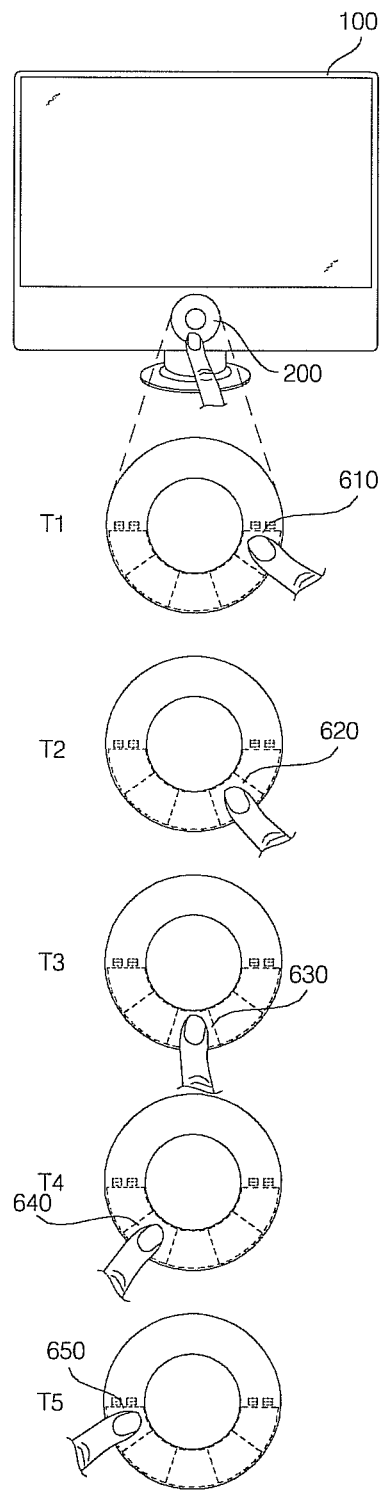
FIGS. 11 to 17 are diagrams showing various examples of light display according to a touch input position of the input device of FIG. 1.

First, referring to FIG. 11, the touch input position of the user's finger is located at a first position 610 close to the first light source unit 210 at a first time T1 and is then moved to a second position 620 from the first light source unit 210 toward the second light source unit 215 at a second time T2. Then, the touch input position is moved to a middle position 630 between the first light source unit 210 and the second light source unit 215 at a third time T3, is moved to a fourth position 640 close to the second light source unit 215 at a fourth time T4, and is moved to a fifth position 650 closer to the second light source unit 215 at a fifth time T5.

As shown in FIG. 10, the light source controller 250 controls the first light source unit 210 or the second light source unit 215 such that at least one of the amount of light emitted from the first light source unit 210 or the amount of light emitted from the second light source unit 215 is changed if the touch input position is changed.

Figure 12:
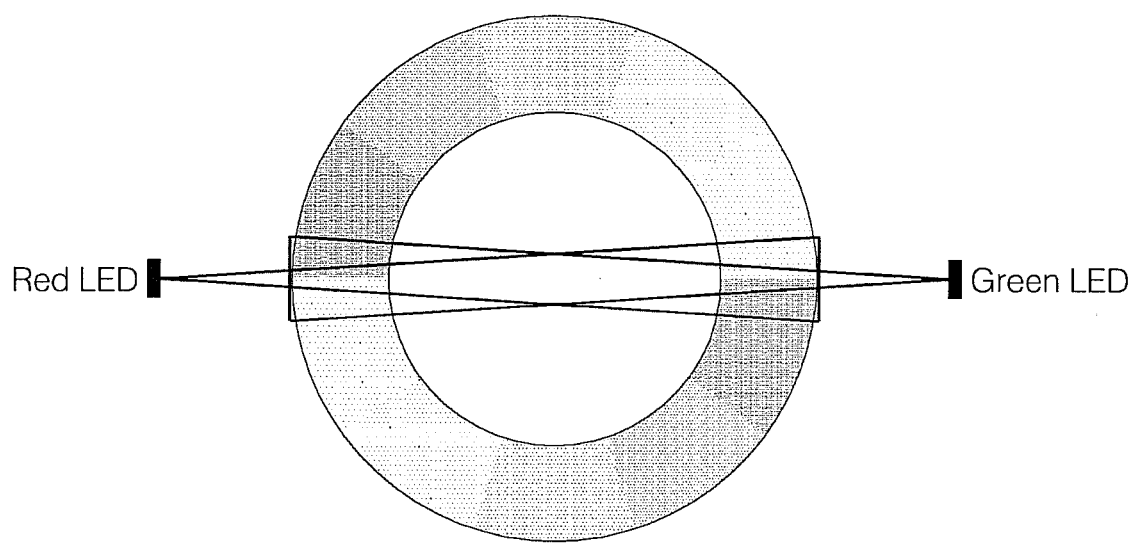

FIG. 12 shows the principle of synthesizing the light emitted from the first light source unit 210 and the light emitted from the second light source unit 215 according to the embodiment of the present invention.

In the embodiment of the present invention, in synthesis of red, green and blue light which is three primary light, the light synthesis principle of red+green=yellow, green+blue=cyan, red+blue=magenta and red+blue+green=white is used.

As described above, if the first light source unit 210 emits red (R) light and the second light source unit 215 emits green (G) light, the light guide 220 guides the red light to the second light source unit 215 and guides the green light to the first light source unit 210. If the amount of light emitted from the first light source unit 210 and the amount of light emitted from the second light source unit 215 are identical, as shown in FIG. 12, yellow light which is obtained by synthesizing the red light and the green light is displayed at the middle position 630 of the input device 200.

That is, the intensity of the red light emitted from the first light source unit 210 is gradually decreased toward the second light source unit 215 and the intensity of the green light emitted from the second light source unit 215 is gradually decreased toward the first light source unit 210 such that the yellow light is displayed at the middle position 630 of the input device 200.

Hereinafter, a light guide including a plurality of light guide layers according to the embodiment of the present invention will be described on the assumption that a first light source unit emits red light and a second light source unit emits green light.

Figure 13:
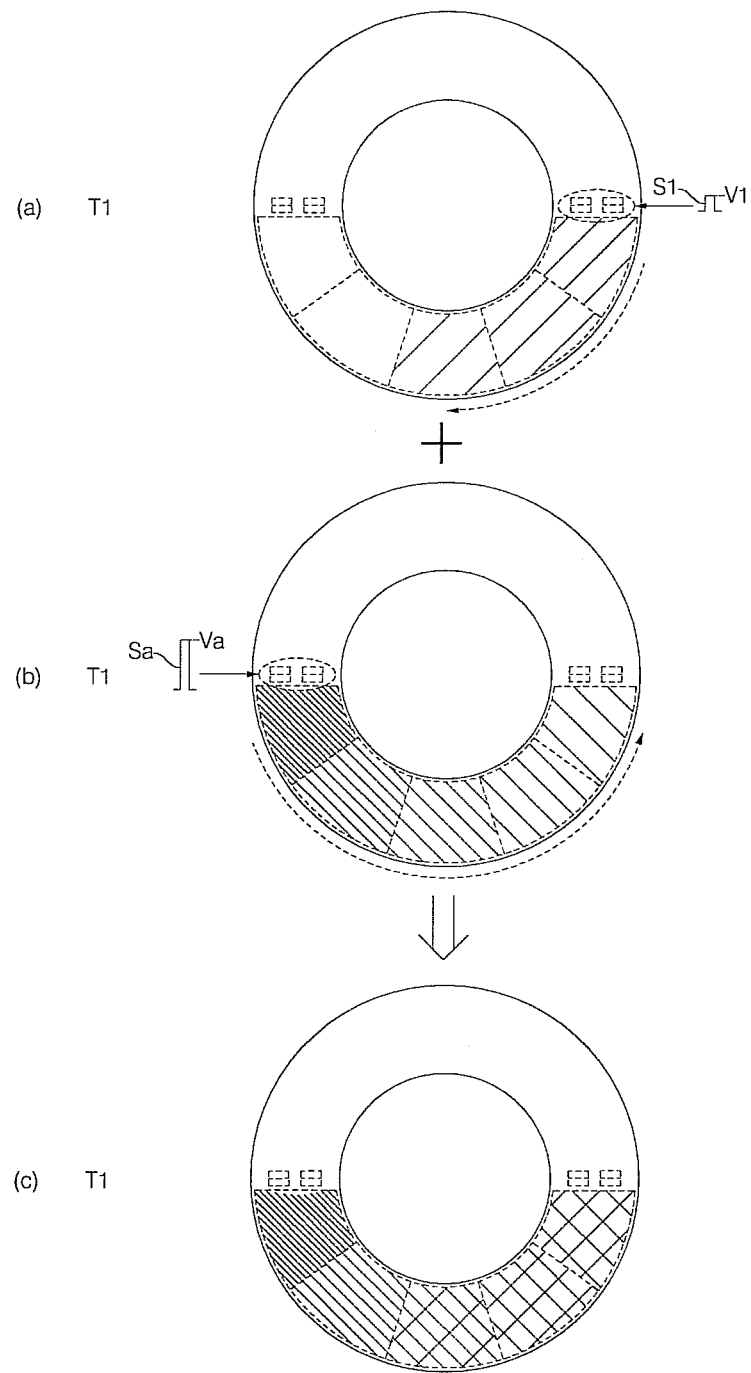

FIG. 13 shows light displayed on the input device 200 in correspondence with the first time T1 of FIG. 11.

Referring to FIG. 13, if the touch input position of the user's finger is the first position 610 at the first time T1, the amount of light emitted from the first light source unit 210 is decreased or the amount of light emitted from the second light source unit 215 is increased such that the yellow light which is obtained by synthesizing the red light and the green light is displayed at the first position 610.

If the amount of light of each light source unit 210 or 215 is controlled using a PAM method, the light source controller 250 may decrease the level of the signal input to the first light source unit 210 or increase the level of the signal input to the second light source unit 215.

If the amount of light of each light source unit 210 or 215 is controlled using a PWM method, the light source controller 250 may decrease the pulse width of the signal input to the first light source unit 210 or increase the pulse width of the signal input to the second light source unit 215.

FIG. 13(a) shows the case where the first electrical signal S1 having a first level V1 is applied to the first light source unit 210 according to a PAM method such that the light emitted from the first light source unit 210 is directed to the second light source unit 215 via the light guide. The first level V1 may be a minimum level and only some of the light emitted from the first light source unit 210 may be guided.

In FIG. 13(a), for convenience of description, the red light emitted from the first light source unit 210 is denoted by oblique lines having an angle of +45 degrees, and a gap between the oblique lines is gradually reduced toward the first light source unit 210.

FIG. 13(b) shows the case where the second electrical signal S2 having a predetermined level Va is applied to the second light source unit 215 according to a PAM method such that the light emitted from the second light source unit 215 is directed to the first light source unit 210 via the light guide. The predetermined level Va may be a maximum level and the amount of light emitted from the second light source unit 215 may be large.

In FIG. 13(b), for convenience of description, the green light emitted from the second light source unit 215 is denoted by oblique lines having an angle of −45 degrees, and a gap between the oblique lines is gradually reduced toward the first light source unit 210.

FIG. 13(c) shows the case where the red light of FIG. 13(a) and the green light of FIG. 13(b) are synthesized. In particular, it can be seen that the position of the yellow light obtained by synthesizing the red light and the green light is the first position 610.

Figure 14:
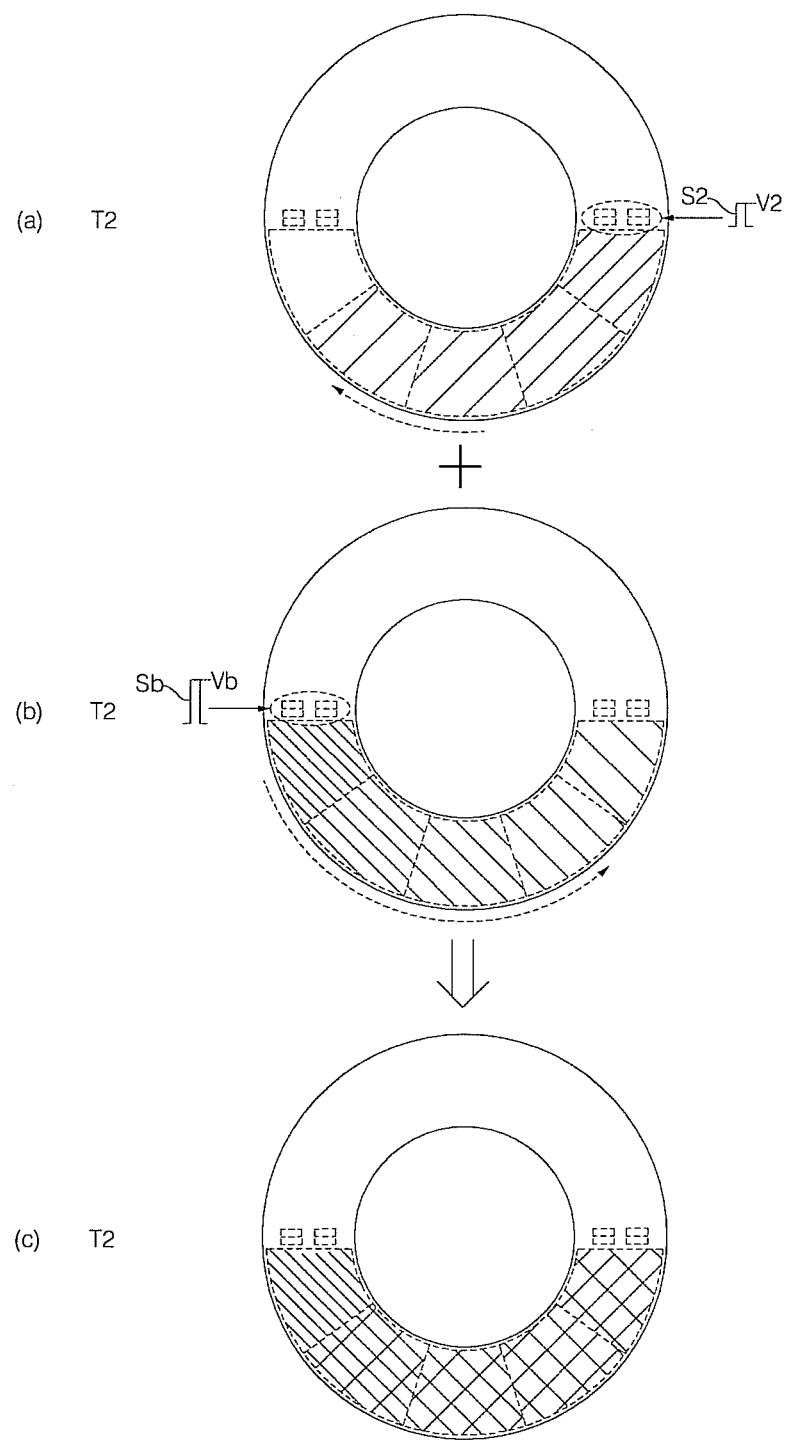

Next, FIG. 14 shows light displayed on the input device 200 in correspondence with the second time T2 of FIG. 11.

In comparison with FIG. 13, first, FIG. 14(a) shows the case where the first electrical signal S1 having a second level V2 is applied to the first light source unit 210 such that the light emitted from the first light source unit 210 is directed to the second light source unit 215 via the light guide. The second level V2 is greater than the first level V1 of FIG. 13(a) and the amount of light emitted from the first light source unit 210 is increased as compared to FIG. 13.

FIG. 14(b) shows the case where the second electrical signal S2 having a predetermined level Vb is applied to the second light source unit 215 such that the light emitted from the second light source unit 215 is directed to the first light source unit 210 via the light guide. The predetermined level Vb is less than the level Va of FIG. 13(b) and the amount of light emitted from the second light source unit 215 is decreased as compared to FIG. 13.

FIG. 14(c) shows the case where the red light of FIG. 14(a) and the green light of FIG. 14(b) are synthesized. In particular, the position of the yellow light obtained by synthesizing the red light and the green light is the second position 620.

Figure 15:
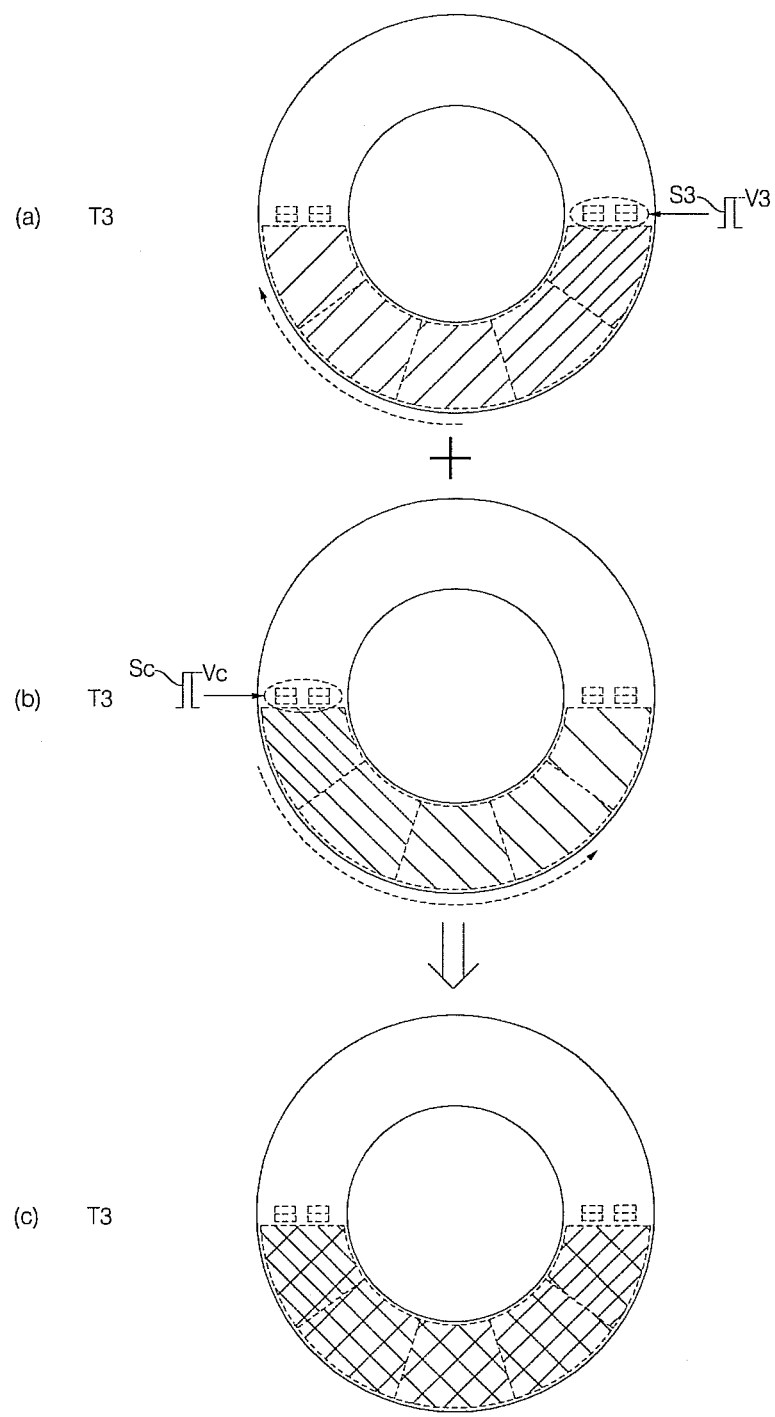
Figure 16:
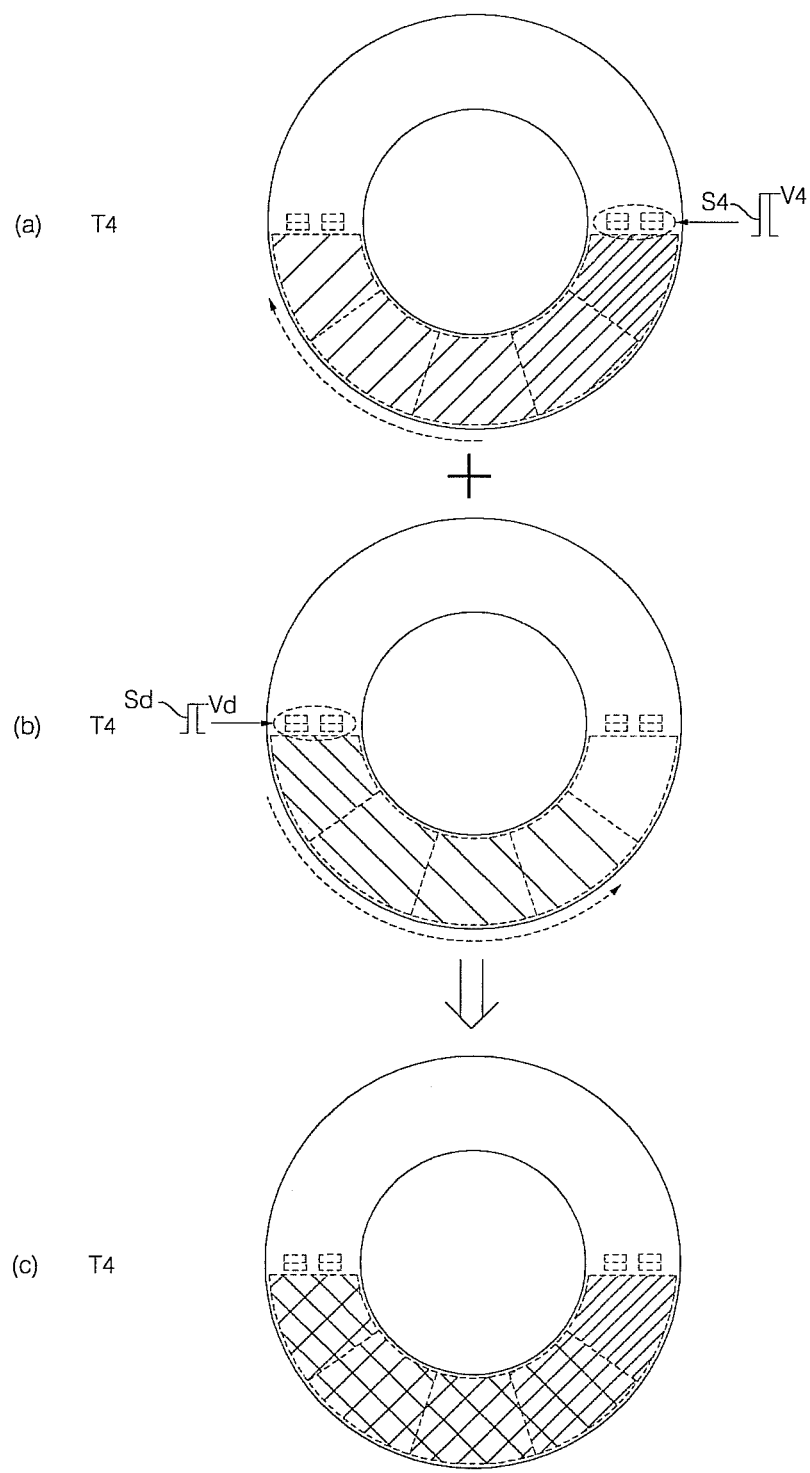
Figure 17:
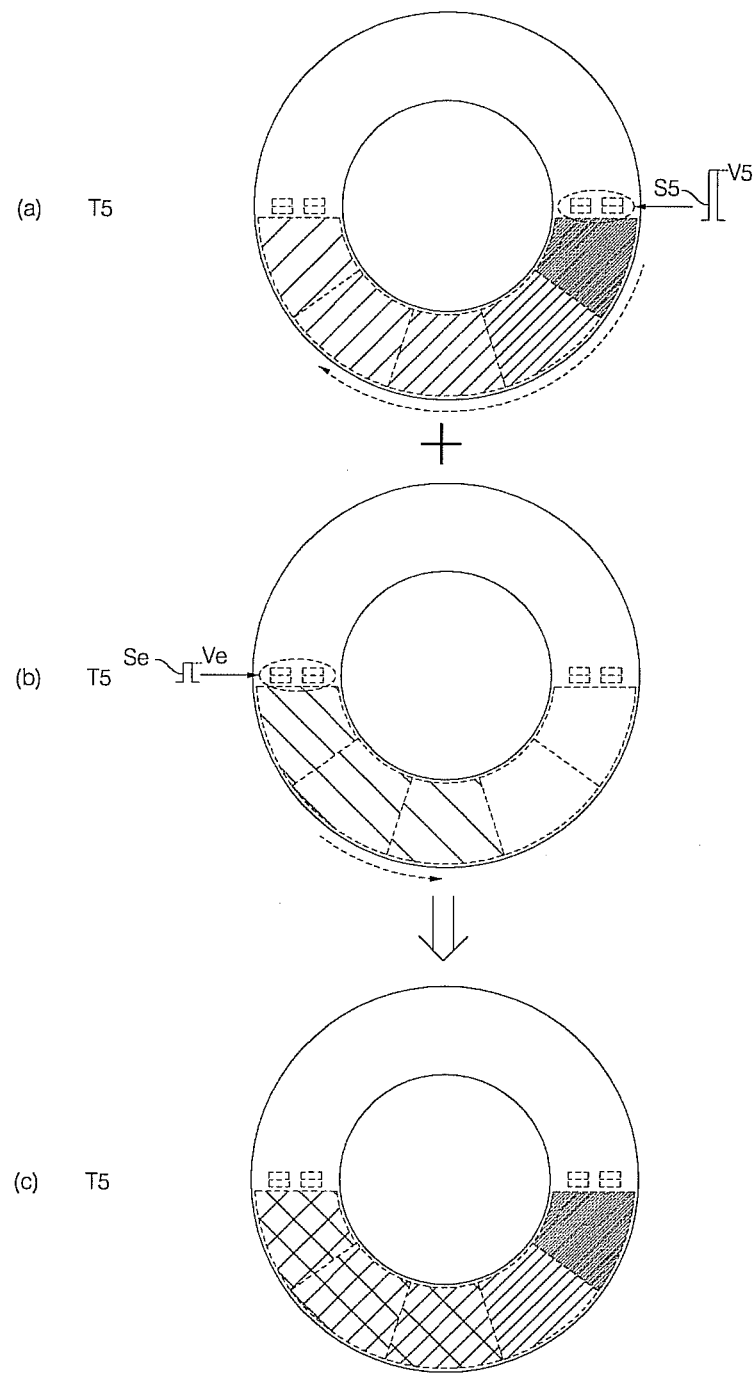

In this way, FIGS. 15 to 17 show the case where the amount of light is gradually increased as the level of the first electrical signal S1 input to the first light source unit 210 is gradually increased in order of V3, V4 and V5 and the amount of light is gradually decreased as the level of the second electrical signal S2 input to the second light source unit 215 is gradually decreased in order of Vc, Vd and Ve.

It can be seen that the position of the yellow light obtained by synthesizing the red light and the green light is changed in order of the third position 630, the fourth position 640 and the fifth position 650.

According to FIGS. 13 to 17, when the touch input position is moved, a moving effect or a gradation effect is generated by controlling the amount of light. Therefore, the user perceives interactivity by touch input.

Although FIGS. 13 to 17 show the case where the touch input position moves from the left to the right, when the touch input position reversely moves from the right to the left, the amount of light may be reversely controlled from the fifth time T5 to the first time T1.

If the touch input position corresponds to the position of the first light source unit 210 or the second light source unit 215, the light source controller 250 may turn any one of the first light source unit 210 or the second light source unit 214 off.

For example, the touch input position corresponds to the position of the first light source unit 210, the light source controller 250 may supply an off signal to the first light source unit 210 such that the first light source unit 210 does not emit red light. At this time, the second light source unit 215 may emit light. Thus, the light guide 230 may guide only the green light emitted from the second light source unit 215.

As another example, if the touch input position corresponds to the position of the first light source unit 210, the light source controller 250 may supply an off signal to the second light source unit 215 such that the second light source unit 215 does not emit green light. At this time, the first light source unit 210 may emit light. Thus, the light guide 230 may guide only the red light emitted from the first light source unit 210.

As another example, if the touch input position corresponds to the position of the second light source unit 215, only red light or green light may be emitted.

If a plurality of input keys is displayed on the board 205, the light source controller 250 determines that an input key corresponding to a touch input position among the plurality of input keys is operated.

As described above, a plurality of input keys such as an input key, a menu key, a volume key, a channel key and a power key may be displayed on the board 205. If the touch input position corresponds to any one of the plurality of input keys, the light source controller 250 determines that an operation corresponding to the input key is performed.

Figure 18:
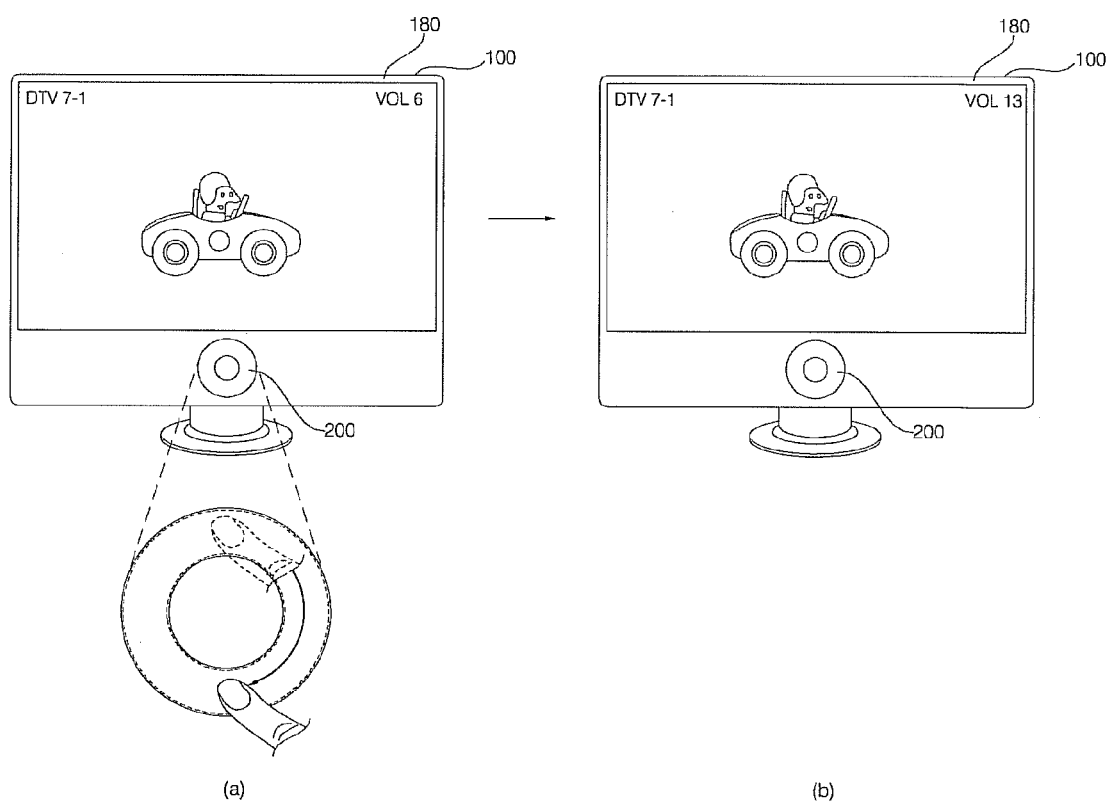
FIGS. 18 to 19 are diagrams showing operation examples of the image display apparatus corresponding to touch input positions.
Figure 19:
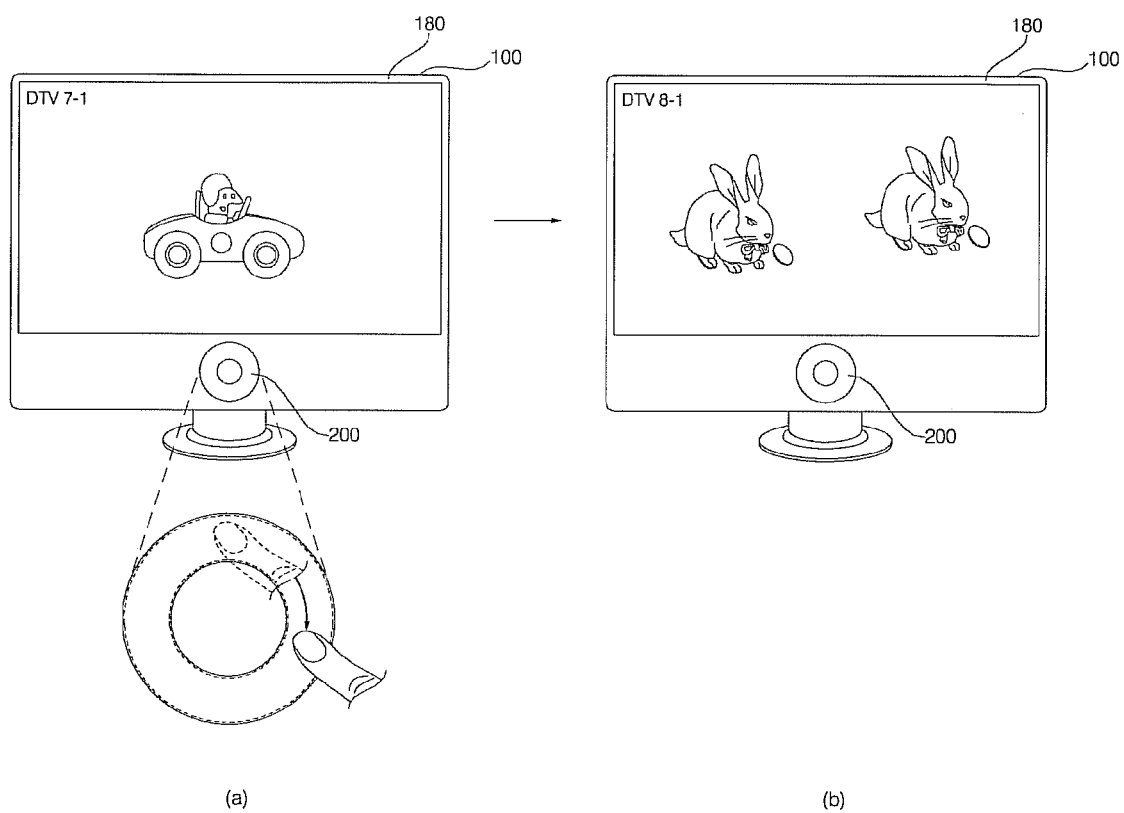

FIGS. 18 to 19 are diagrams showing various operation examples of the image display apparatus corresponding to touch input positions.

As described above, referring to FIG. 18, if a user performs touch input, that is, rightward rotation touch input, using the input device in a state in which broadcast video of a predetermined channel DTV 7-1 is displayed on the display 180 of the image display apparatus 100, the volume of the broadcast video may be controlled. As shown in FIG. 18, a volume-up operation from a volume level 6 to a volume level 13 may be performed. At this time, the input device 200 may output light such that the amount of light emitted from the first light source unit 210 and the amount of light emitted from the second light source unit 215 are inversely proportional to each other, according to rotation touch input.

If leftward rotation touch input is performed, a volume-down operation may be performed. Thus, the user can conveniently perform a volume control operation using the input device.

Next, referring to FIG. 19, if a user performs touch input, that is, rightward rotation touch input, using the input device in a state in which broadcast video of a predetermined channel DTV 7-1 is displayed on the display 180 of the image display apparatus 100, the channel of the broadcast video may be controlled. As shown in FIG. 19, a channel-up operation from a DTV 7-1 channel to a DTV 9-1 channel may be performed. At this time, the input device 200 may output light such that the amount of light emitted from the first light source unit 210 and the amount of light emitted from the second light source unit 215 are inversely proportional to each other, according to rotation touch input.

If leftward rotation touch input is performed, a channel-down operation may be performed. Thus, the user can conveniently perform a channel control operation using the input device.

In FIGS. 18 and 19, the volume control operation and the channel control operation are respectively performed although the same rightward rotation operation is performed using the input device 200. The volume control operation and the channel control operation may be performed according to an initial touch input position of the input device 200 or touch input strength.

Alternatively, a volume or channel may be controlled using the input device 200 after entering a volume control mode or a channel control mode through a separate menu.

Figure 20:
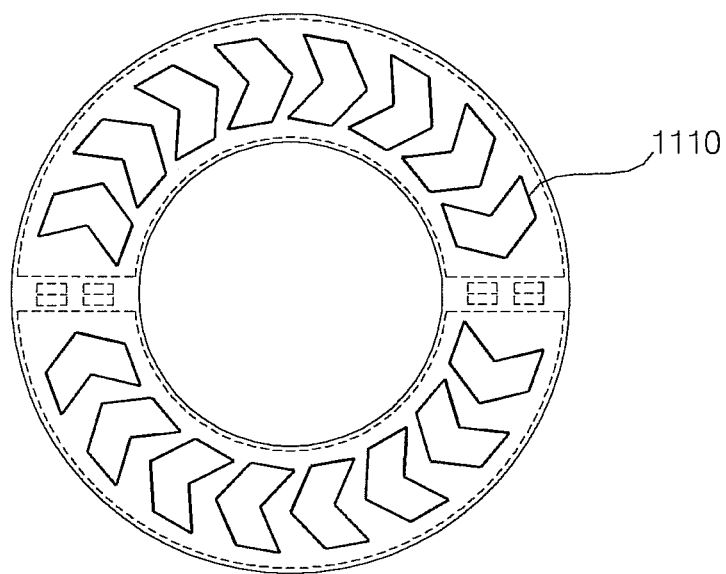
FIG. 20 is a diagram showing another example of a coupling structure of the input device of FIG. 1.

FIG. 20 is a diagram showing another example of a coupling structure of the input device of FIG. 1.

Referring to FIG. 20, the light guide 230 may include at least one of a first direction pattern from the first light source unit 210 to the second light source unit 215 or a second direction pattern from the second light source unit 215 to the first light source unit 210.

In FIG. 20, a plurality of first direction patterns 1110 from the first light source unit 210 to the second light source unit 215 is formed. The first direction patterns 1110 may be formed on the light guide 230 in a groove shape or a recess shape.

Unlike FIG. 20, the first direction patterns may be formed on the board 205. More specifically, the first direction patterns may be formed on a lower surface of the board 205 which is in contact with the light guide 230.

For example, by touch input such as flicking or sliding, the amount of light emitted from the first light source unit 210 is changed, the amount of light emitted from the second light source unit 215 is changed, the light obtained by synthesizing the light emitted from the first and second light source units is changed, and the directivity of the light is further increased by the first direction patterns 1110. Accordingly, it is possible to further increase interactivity.

FIGS. 21 to 24 are diagrams showing various examples of light display according to touch input strength of the input device of FIG. 1.

In each of the input devices of FIGS. 21 to 24, each of the first light source unit 210 and the second light source unit 215 includes a plurality of light sources for emitting light having different colors.

That is, the first light source unit 210 may include a red light source, a green light source and a blue light source. The second light source unit 215 may include a green light source, a blue light source and a red light source.

Figure 21:
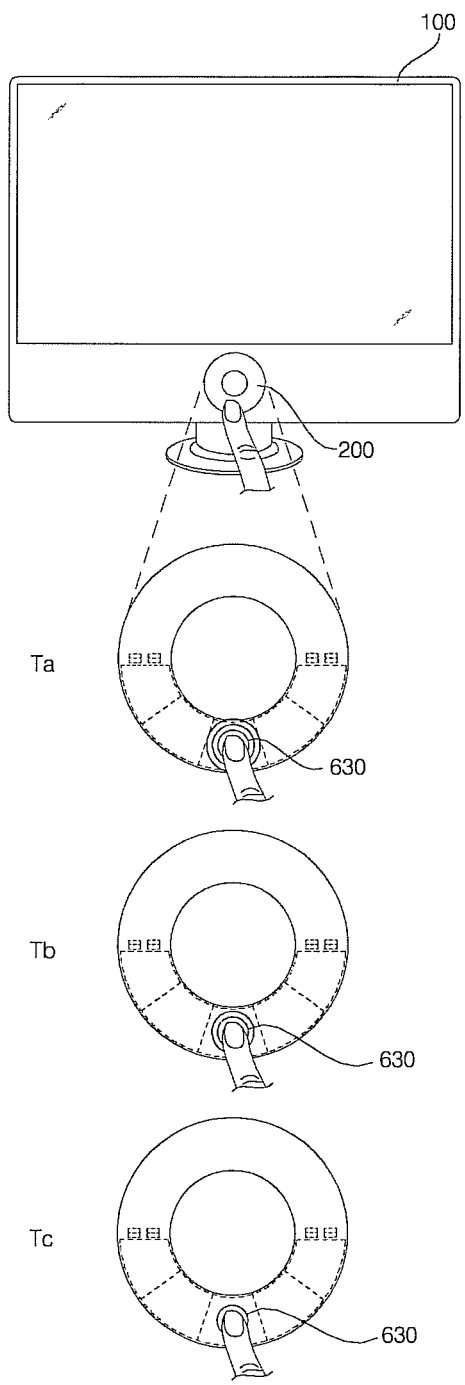
FIGS. 21 to 24 are diagrams showing various examples of light display according to touch input strength of the input device of FIG. 1.
Figure 22:
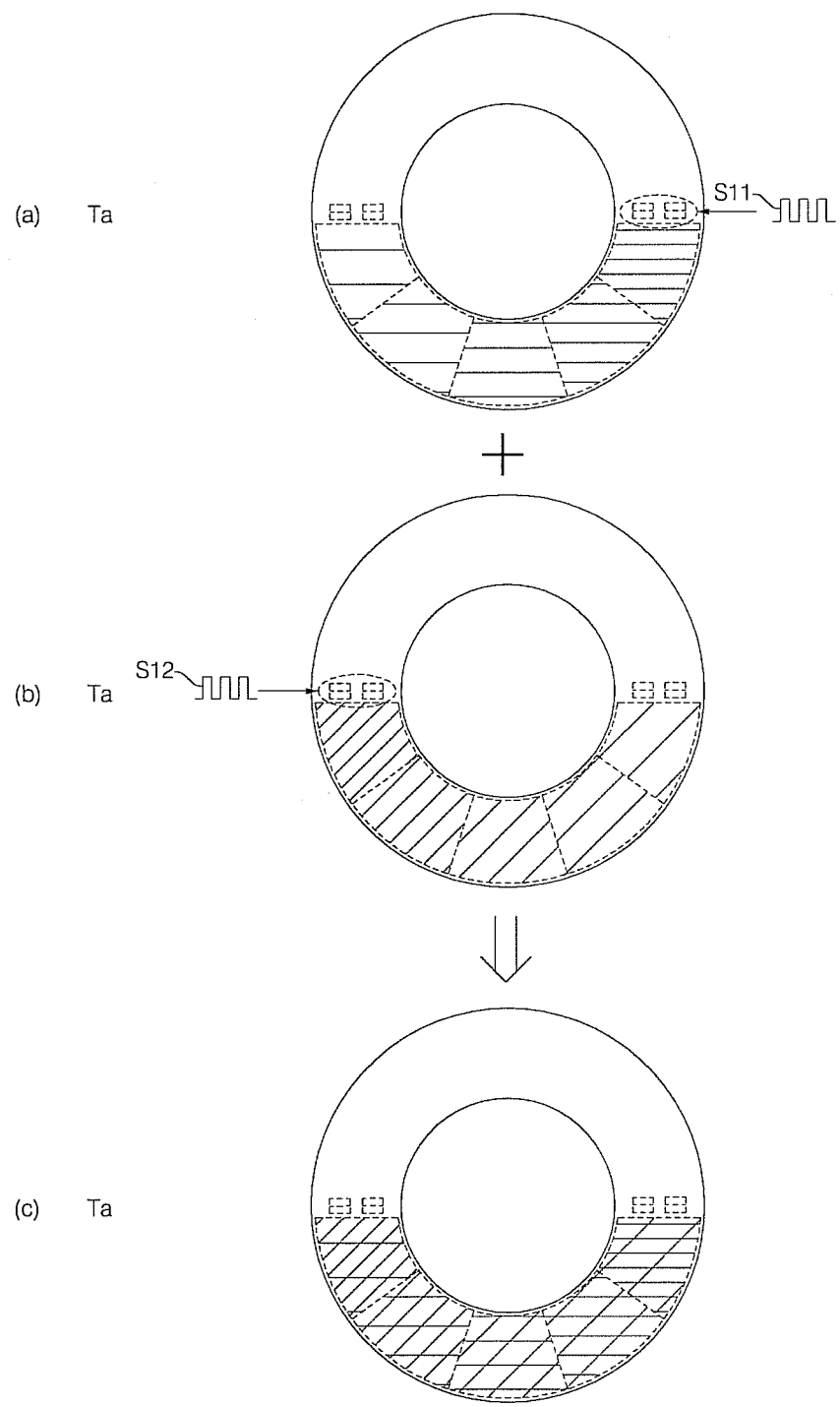

First, at a time Ta of FIG. 21, if touch input strength is highest (corresponding to three times of touch) in a state in which the touch input position corresponds to the middle position 630, as shown in FIG. 22, the first light source unit 210 may emit blue light and the second light source unit 215 may emit red light.

FIG. 22(a) shows the case of applying a first electrical signal S11 having three pulses to the first light source unit 210 according to touch input strength. Then, blue light is emitted from the first light source unit 210 and is directed to the second light source unit 215 through the light guide. In FIG. 22(a), the blue light is denoted by horizontal lines.

FIG. 22(b) shows the case of applying a second electrical signal S12 having three pulses to the second light source unit 215 according to touch input strength. Then, red light is emitted from the second light source unit 215 and is directed to the first light source unit 210 through the light guide. In FIG. 22(b), the red light is denoted by oblique lines having an angle of +45 degrees.

FIG. 22(c) shows the case of synthesizing the blue light of FIG. 22(a) and the red light of FIG. 22(b). In particular, magenta light may be displayed at the middle position 630.

If the touch input position is changed, as described above, at least one of the amount of blue light emitted from the first light source unit 210 or the amount of red light emitted from the second light source unit 215 is changed.

Figure 23:
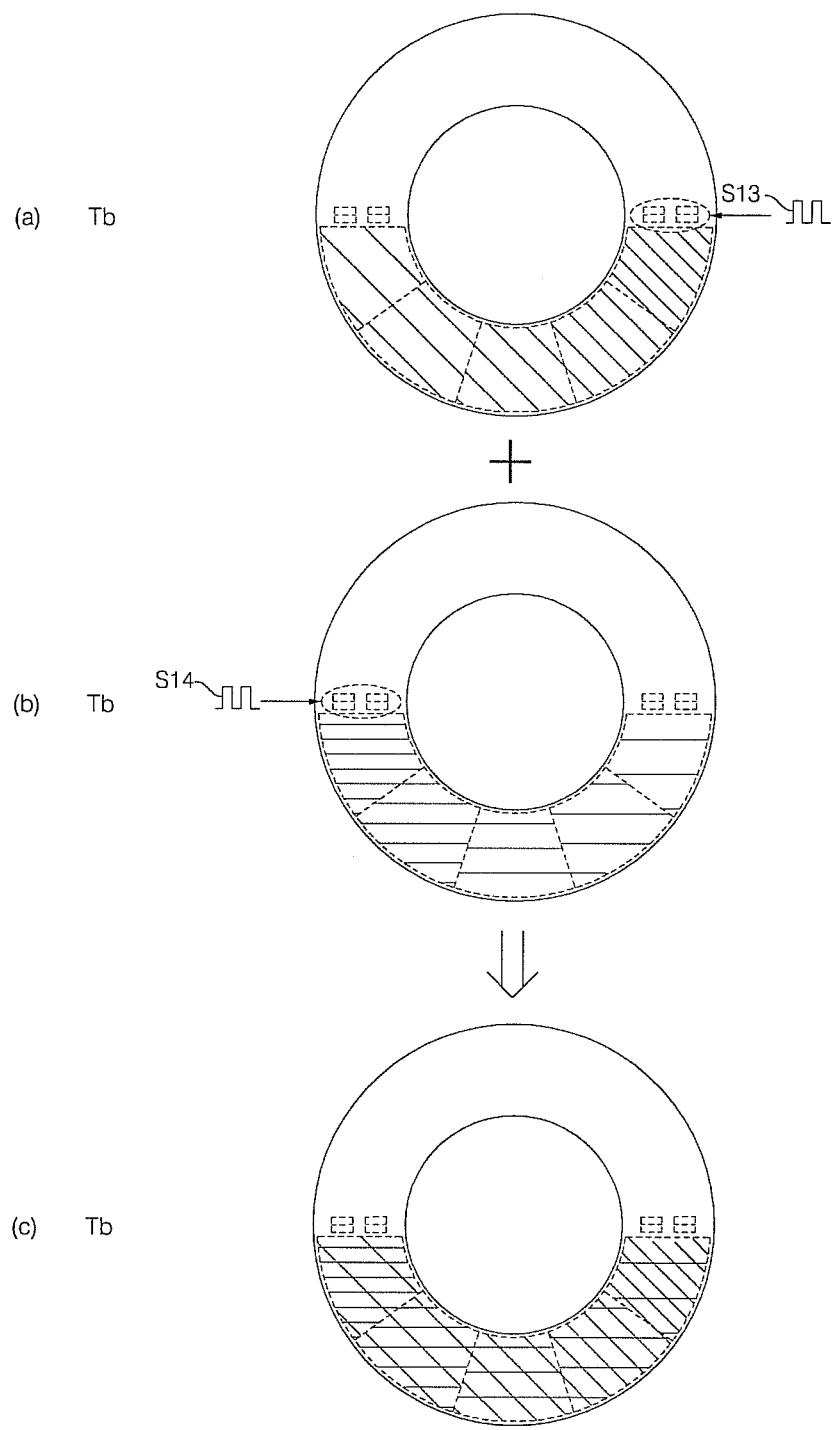

Next, at a time Tb of FIG. 21, if touch input strength is medium (corresponding to two times of touch) in a state in which the touch input position corresponds to the middle position 630, as shown in FIG. 23, the first light source unit 210 may emit green light and the second light source unit 215 may emit blue light.

FIG. 23(a) shows the case of applying a first electrical signal S13 having two pulses to the first light source unit 210 according to touch input strength. Then, green light is emitted from the first light source unit 210 and is directed to the second light source unit 215 through the light guide. In FIG. 23(a), the green light is denoted by oblique lines having an angle of −45 degrees.

FIG. 23(b) shows the case of applying a second electrical signal S14 having two pulses to the second light source unit 215 according to touch input strength. Then, blue light is emitted from the second light source unit 215 and is directed to the first light source unit 210 through the light guide. In FIG. 23(b), the blue light is denoted by horizontal lines.

FIG. 23(c) shows the case of synthesizing the green light of FIG. 23(a) and the blue light of FIG. 23(b). In particular, cyan light may be displayed at the middle position 630.

Figure 24:
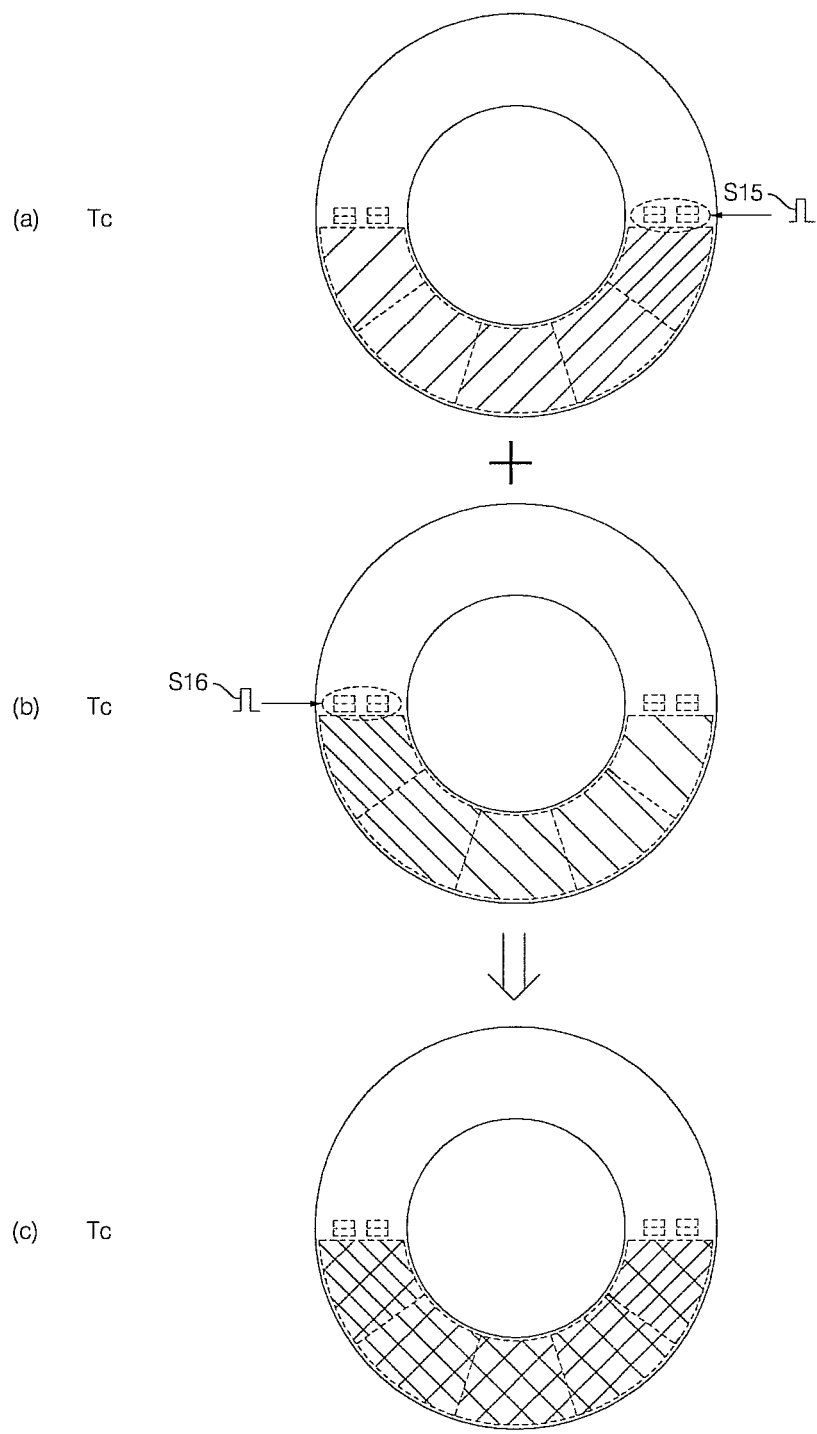

Next, at a time Tc of FIG. 21, if touch input strength is lowest (corresponding to one time of touch) in a state in which the touch input position corresponds to the middle position 630, as shown in FIG. 24, the first light source unit 210 may emit red light and the second light source unit 215 may emit green light.

FIG. 24(a) shows the case of applying a first electrical signal S15 having one pulse to the first light source unit 210 according to touch input strength. Then, red light is emitted from the first light source unit 210 and is directed to the second light source unit 215 through the light guide. In FIG. 24(a), the red light is denoted by oblique lines having an angle of +45 degrees.

FIG. 24(b) shows the case of applying a second electrical signal S16 having one pulse to the second light source unit 215 according to touch input strength. Then, green light is emitted from the second light source unit 215 and is directed to the first light source unit 210 through the light guide. In FIG. 24(b), the green light is denoted by oblique lines having an angle of −45 degrees.

FIG. 24(c) shows the case of synthesizing the red light of FIG. 24(a) and the green light of FIG. 24(b). In particular, yellow light may be displayed at the middle position 630.

Therefore, by changing at least one of the color of the light emitted from the first light source unit or the color of the light emitted from the second light source unit, it is possible to variously implement interactivity during touch input.

FIG. 25 is a diagram showing a remote controller including an input device according to another embodiment of the present invention.

Referring to FIG. 25, the input device 200 according to the embodiment of the present invention is applied to the remote controller 300. Not only various input operations but also light output by synthesis of the light emitted from the first light source unit and the second light source unit may be performed using the input device having a circular shape according to the present invention.

Figure 26:
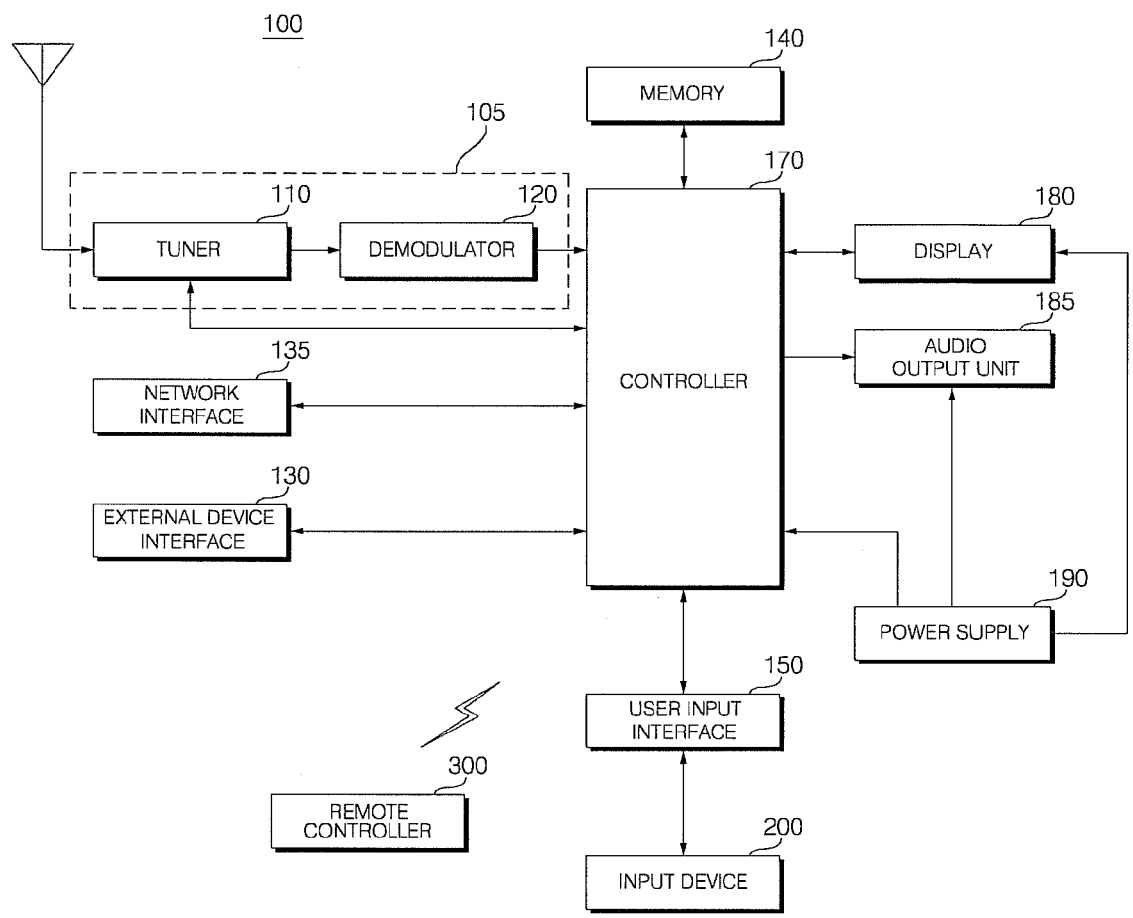
FIG. 26 is a block diagram of the image display apparatus of FIG. 1.

FIG. 26 is a block diagram of the image display apparatus of FIG. 1.

Referring to FIG. 26, the image display apparatus 100 according to the embodiment of the present invention may be a broadcast display apparatus.

The image display apparatus 100 may include a broadcast receiver 105, an external device interface 130, a network interface 135, a memory 140, a user input interface 150, a controller 170, a display 180, an audio output unit 185, a power supply 190 and an input device 200.

The broadcast receiver 105 may include a tuner 110, a demodulator 120 and a network interface 130. As needed, the broadcast receiver 105 may include only the tuner 110 and the demodulator 120 or only the network interface 130.

The tuner 110 tunes to a Radio Frequency (RF) broadcast signal corresponding to a channel selected by a user from among RF broadcast signals received through an antenna or RF broadcast signals corresponding to all channels previously stored in the image display apparatus. The tuner 110 converts the tuned RF broadcast into an Intermediate Frequency (IF) signal or a baseband Audio/Video (AV) signal.

The demodulator 120 receives the digital IF signal DIF from the tuner 110 and demodulates the digital IF signal DIF.

The demodulator 120 may perform demodulation and channel decoding, thereby obtaining a stream signal TS. The stream signal may be a signal in which a video signal, an audio signal and a data signal are multiplexed.

The stream signal output from the demodulator 120 may be input to the controller 170 and thus subjected to demultiplexing and A/V signal processing. The processed video and audio signals are output to the display 180 and the audio output unit 185, respectively.

The external device interface 130 may serve as an interface between an external device and the image display apparatus 100. For interfacing, the external device interface 130 may include an A/V Input/Output (I/O) unit (not shown) and/or a wireless communication module (not shown).

The network interface 135 serves as an interface between the image display apparatus 100 and a wired/wireless network such as the Internet. The network interface 135 may receive content or data provided by an Internet or content provider or a network operator over a network.

The memory 140 may store various programs necessary for the controller 170 to process and control signals, and may also store processed video, audio and data signals.

The memory 140 may temporarily store a video, audio and/or data signal received from the external device interface 130. The memory 140 may store information about a predetermined broadcast channel by the channel storage function such as a channel map.

The user input interface 150 transmits a signal input by the user to the controller 170 or transmits a signal received from the controller 170 to the user.

The input device 200 may synthesize the light emitted from the first light source unit and the light emitted from the second light source unit so as to output the synthesized light and change and output at least one of the amount of light emitted from the first light source unit or the amount of light emitted from the second light source unit according to touch input position.

The input device 200 may output light such that the amount of light emitted from the first light source unit and the amount of light emitted from the second light source unit are inversely proportional to each other according to touch input position.

The input device 200 may change at least one of the amount of light emitted from the first light source unit or the amount of light emitted from the second light source unit according to the number of times of touch input or touch input strength.

The input device 200 may change at least one of the color of the light emitted from the first light source unit or the color of the light emitted from the second light source unit according to the number of times of touch input or touch input strength.

The touch input position information, the touch input number information or the touch input strength information of the input device 200 may be input to the controller 170 through the user input interface 150.

The input device 200 according to the embodiment of the present invention may be any one of the input devices described with reference to FIGS. 1 to 24, which will be omitted herein.

The controller 170 may control performance of an operation corresponding to touch input from the input device 200.

For example, in a state in which a plurality of input keys such as an input key, a menu key, a volume key, a channel key and a power key is displayed on the board 205, the volume may be controlled as shown in FIG. 18 or the channel may be controlled as shown in FIG. 19. In addition, the power on/off operation of the image display apparatus 100 may be performed.

If the image display apparatus 100 is a monitor, the controller 170 may control the display of the menu object including a brightness control item, a definition control item, an image quality control item, a horizontal position control item, a vertical position control item, an OSD language control item, etc. in correspondence with touch input from the input device 200.

The controller 170 may demultiplex the stream signal received from the tuner 110, the demodulator 120, or the external device interface 130, process the demultiplexed signals, and generate and output audio or video signals.

The video signal processed by the controller 170 may be sent to the display 180 to be displayed as an image. The video signal processed by the controller 170 may also be transmitted to an external output device through the external device interface 130.

The audio signal processed by the controller 170 may be audibly output to the audio output unit 185. Also, the audio signal processed by the controller 170 may be transmitted to the external output device through the external device interface 130.

While not shown in FIG. 27, the controller 170 may include a DEMUX, a video processor, etc., which will be described below with reference to FIG. 28.

The display 180 converts the video signal, the data signal, the OSD signal and the control signal processed by the controller 170 or the video signal, the data signal and the control signal received by the external device interface 130 and generates a drive signal.

The display 180 may be a projector, a Plasma Display Panel (PDP), a Liquid Crystal Display (LCD), an Organic Light-Emitting Diode (OLED) display or a flexible display. In particular, in the embodiment of the present invention, the display 180 may be a 3D display.

The audio output unit 185 receives the audio signal processed by the controller 170 and outputs the received audio signal as sound.

The power supply 190 supplies power to the image display apparatus 100. Particularly, the power supply 190 may supply power to the controller 170 which may be implemented as a System On Chip (SOC), the display 180 for displaying the video signal, and the audio output unit 185 for outputting the audio signal.

The power supply 190 may include a converter (not shown) for converting an AC voltage into a DC voltage. The power supply 190 may further include a DC/DC converter for changing the level of the DC voltage and outputting the DC voltage with the changed level.

The block diagram of the image display apparatus 100 shown in FIG. 26 is an embodiment of the present invention. Some of the components of the block diagram of FIG. 26 may be combined or omitted and new components may be added to the block diagram of FIG. 26.

The image display apparatus 100 according to one embodiment of the present invention may be an image display apparatus without a broadcast reception function, e.g., a monitor. In this case, the above-described broadcast receiver 105 may not be included.

Figure 27:
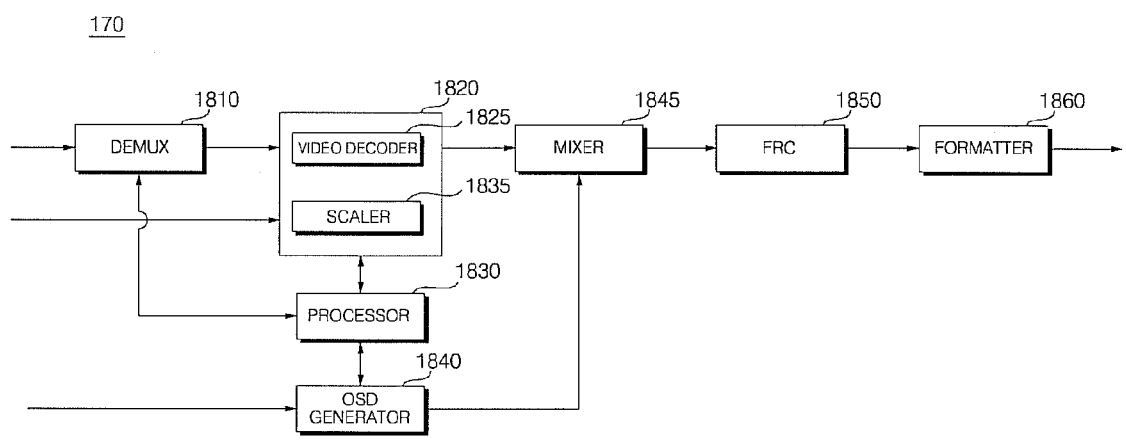
FIG. 27 is a block diagram of a controller of FIG. 26.

FIG. 27 is a block diagram of the controller of FIG. 26.

Referring to FIG. 27, the controller 170 according to one embodiment of the present invention includes a DEMUX 1810, a video processor 1820, a processor 1830, an OSD generator 1840, a mixer 1845, a frame rate converter (FRC) 1850, and a formatter 1860. The controller 170 may further include an audio processor (not shown) and a data processor (not shown).

The DEMUX 1810 demultiplexes an input stream into a video signal, an audio signal, and a data signal. The stream signal input to the DEMUX 1810 may be received from the tuner 110, the demodulator 120 or the external device interface 135.

The video processor 1820 may process the demultiplexed video signal. For video signal processing, the video processor 1820 may include a video decoder 1825 and a scaler 1835.

The video decoder 1825 decodes the demultiplexed video signal and the scaler 1835 scales the resolution of the decoded video signal so that the video signal can be displayed on the display 180.

The video decoder 1825 may include decoders that operate based on various standards.

The processor 1830 may control the overall operation of the image display apparatus 100 or the controller 170. For example, the processor 1830 controls the tuner 110 to tune to a channel selected by the user and controls the image display apparatus 100 by a user command input through the user input interface 150 or an internal program.

The processor 1830 may control the operations of the DEMUX 1810, the video processor 1820 and the OSD generator 1840 of the controller 170.

The OSD generator 1840 generates an OSD signal autonomously or according to user input. For example, the OSD generator 1840 may generate signals, by which a variety of information is displayed as images or text on the screen of the display 180, according to a user input signal received through the input device 200. The OSD signal may include various data such as a UI, a variety of menu screens, widgets, icons, etc. of the image display apparatus 100.

The mixer 1845 may mix the decoded video signal processed by the video processor 1820 with the OSD signal generated by the OSD generator 1840 and output the mixed signal to the FRC 1850.

The FRC 1850 may change the frame rate of an input image. The FRC 1850 may maintain the frame rate of the input image without frame rate conversion.

The formatter 1860 receives the mixed signal from the mixer 1845, that is, the OSD signal and the decoded video signal, changes the format of the mixed signal to be suitable for the display 180. For example, the formatter 1860 may convert a received signal into an RGB data signal. The RGB signal may be output in the form of a Low Voltage Differential Signal (LVDS) or mini-LVDS.

The formatter 1860 may divide the video signal into a 2D image signal and a 3D video signal, for 3D video display. The formatter 1860 may change the format of the 3D video signal or convert a 2D video signal into a 3D video signal.

The audio processor (not shown) of the controller 170 may process the demultiplexed audio signal. For audio signal processing, the audio processor (not shown) may have a plurality of decoders.

The audio processor (not shown) of the controller 170 may also adjust the bass, treble or volume of the audio signal.

The data processor (not shown) of the controller 170 may process the demultiplexed data signal. For example, if the demultiplexed data signal is an encoded signal, the controller 170 may decode the data signal. The encoded data signal may be an EPG which includes broadcasting information specifying the start time, end time, etc. of scheduled broadcast programs.

The block diagram of the controller 170 illustrated in FIG. 27 is an embodiment of the present invention. Depending upon the specifications of the controller 170, the components of the controller 170 may be combined, or omitted. New components are added to the controller 170.

In particular, the FRC 1850 and the formatter 1860 may not be included in the controller 170 and may be separately provided or omitted.

Figure 28:
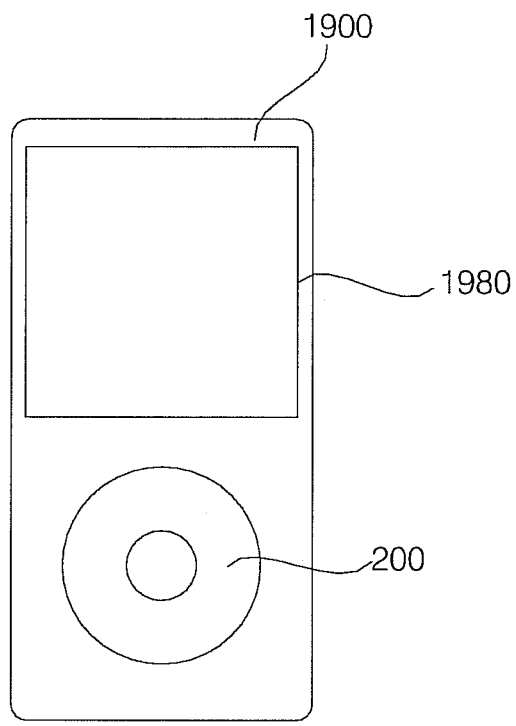
FIG. 28 is a diagram showing an image display apparatus including an input device according to another embodiment of the present invention.

FIG. 28 is a diagram showing an image display apparatus including an input device according to another embodiment of the present invention.

Referring to FIG. 28, the image display apparatus 1900 of FIG. 28 may be a mobile terminal including a display 1980 and an input device 200. For example, the mobile terminal 1900 may be a mobile phone, a PMP, an e-book, an MP3 player, a music player, etc.

As described above, the input devices 200 described with reference to FIGS. 1 to 24 are applicable to a mobile terminal. Thus, even in the mobile terminal, it is possible to increase interactivity by controlling the amount of light according to touch input position.

According to the embodiments of the present invention, if touch input is performed between first and second light source units arranged spaced apart from each other, at least one of a first electrical signal sent to the first light source unit or a second electrical signal sent to the second light source unit is changed according to touch information such that at least one of the amount of light emitted from the first light source unit or the amount of light emitted from the second light source unit is changed. That is, it is possible to provide interactivity during touch input. Accordingly, it is possible to improve user convenience.

That is, by changing the amount of light emitted from the first light source unit and the amount of light emitted from the second light source unit in inverse proportion to each other according to touch position information of touch information, it is possible to increase interactivity.

By changing at least one of the amount of light emitted from the first light source unit or the amount of light emitted from the second light source unit according to touch number information, touch strength information, touch distance information or touch duration information of touch information, it is possible to implement various feedback effects.

By changing at least one of the color of light emitted from the first light source unit or the color of light emitted from the second light source unit according to the touch number information, touch strength information, touch distance information or touch duration information of touch information, it is possible to variously implement interactivity during touch input.

An image display apparatus including an input device according to an embodiment of the present invention includes a circular light guide, performs an operation corresponding to a touch input position, and changes and outputs at least one of light emitted from a first light source unit or light emitted from a second light source unit, thereby providing interactivity during touch input. Accordingly, it is possible to improve user convenience.

As a result, in the image display apparatus including the input device according to the embodiment of the present invention, it is possible to provide various user interfaces such as channel control or volume control. Accordingly, it is possible to improve user convenience.

The input device and the image display apparatus according to the present invention may be implemented as code that can be written to a computer-readable recording medium and can thus be read by a processor included in an image display device. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An input device comprising:

first and second light source units arranged spaced apart from each other and configured to respectively output a first light having a first color and a second light having a second color;

a light guide having a circular shape and configured to receive the first light and the second light, synthesize the first light and the second light and output a third synthesized light;

a proximity sensor to detect a user's finger that approaches the input device within a predetermined range;

a touch sensor configured to detect touch input; and a light source controller configured to control an emission of light from at least one of a first light emitting device or a second light emitting device in an active state, when the proximity sensor detects that the user approaches the input device within the predetermined range in an idle state in which the light is not emitted, and the light source controller to control the third synthesized light output from the light guide based on the touch input detected by the touch sensor, wherein the first light source unit includes a plurality of light sources for emitting light in a first direction and a plurality of light sources for emitting light in a second direction, the second light source unit includes a plurality of light sources for emitting light in a first direction and a plurality of light sources for emitting light in a second direction, and the light source controller is configured to control turning on of light sources of the first light source unit so as to emit light in a direction corresponding to a touch input position and to control turning on at least one light source of the second light source unit so as to emit light in the direction corresponding to the touch input position, wherein the light source controller increases an amount of the first light output from the first light source unit when a position information of the touch input is closer to the second light source unit than the first light source unit, wherein the light source controller decreases an amount of the second light output from the second light source unit when the position information of the touch input is closer to the second light source unit than the first light source unit, and wherein the light source controller controls light output such that the amount of first light of the first light source unit and the amount of second light of the second light source unit are changed in inverse proportion to each other according to position information of touch input, wherein the controller to determine whether a touch input is one of a low touch input strength, a middle touch input strength, and a highest touch input strength, wherein in response to a touch input having a highest touch input strength, the light source controller to apply a first electrical signal having three pulses to the first light source unit, and based on the first electrical signal a first color emitted from the first light source unit is directed to the second light source unit through the light guide; and wherein in response to a touch input having the highest touch input strength, the light source controller to apply a second electrical signal having three pulses to the second light source unit based on the touch input strength, and based on the second electrical signal a second color emitted from the second light source unit is directed to the first light source unit though the light guide.

2. The input device according to claim 1, wherein the light source controller controls intensity of the third synthesized light output from the light guide based on at least one of position informations of the touch input, a number of times of the touch input, a duration of the touch input, a moving distance of the touch input or a strength of the touch input.

3. The input device according to claim 1, wherein the light source controller disables output of any one of the first light output from the first light source unit or the second light output from the second light source unit when the position information of the touch input corresponds to a position of the first light source unit or a position of the second light source unit.

4. The input device according to claim 1, wherein the first light source unit and the second light source unit emit light having different colors.

5. The input device according to claim 1, wherein the light source controller changes at least one of the color of the first light output from the first light source unit or the color of the second light output from the second light source unit according to at least one of position informations of the touch input, a number of times of the touch input, a duration of the touch input, a moving distance of the touch input or a strength of the touch input.

6. The input device according to claim 1, further comprising:
  a circular board configured to transmit and output the light synthesized by the light guide; and
  a reflective layer arranged below the light guide and configured to reflect the light synthesized by the light guide toward the board.

7. The input device according to claim 1, wherein the light guide includes at least one of a first direction pattern from the first light source unit to the second light source unit or a second direction pattern from the second light source unit to the first light source unit.

8. The input device according to claim 1, wherein the light source controller controls output of light having different colors from the first light source unit and the second light source unit according to a position, when a position information of the touch input corresponds to a first position or a second position which is opposite to the first position with respect to an extension of the first light source unit and the second light source unit.

9. The input device according to claim 1, further comprising a setting unit configured to perform a setting of time or temperature based on the touch input detected by the touch sensor.

10. An image display apparatus comprising:
  a display configured to display an image;
  an input device including first and second light source units arranged spaced apart from each other and configured to respectively output a first light having a first color and a second light having a second color, a light guide having a circular shape and configured to receive the first light and the second light, synthesize the first light and the second light and output a third synthesized light, a proximity sensor to detect a user's finger that approaches the input device within a predetermined range, and a touch sensor configured to detect touch input, the input device being configured to output at least one of the first light output from the first light source unit or the second light output from the second light source unit based on the touch input; and
  a controller configured to control an emission of light from at least one of a first light emitting device or a second light emitting device in an active state, when the proximity sensor detects that the user approaches the input device within the predetermined range in an idle state in which the light is not emitted, and the controller to control an operation corresponding to the touch input,
  wherein the first light source unit includes a plurality of light sources for emitting light in a first direction and a plurality of light sources for emitting light in a second direction,
  the second light source unit includes a plurality of light sources for emitting light in a first direction and a plurality of light sources for emitting light in a second direction, and
  the controller is configured to control turning on of light sources of the first light source unit so as to emit light in a direction corresponding to a touch input position and to control turning on of at least one light source of the second light source unit so as to emit light in the direction corresponding to the touch input position,
  wherein the controller increases an amount of the first light output from the first light source unit when a position information of the touch input is closer to the second light source unit than the first light source unit,
  wherein the controller decreases an amount of the second light output from the second light source unit when the position information of the touch input is closer to the second light source unit than the first light source unit, and
  wherein the input device outputs light such that the amount of first light of the first light source unit and the amount of second light of the second light source unit are inversely proportional to each other according to position information of touch input,
  wherein the controller to determine whether a touch input is one of a low touch input strength, a middle touch input strength, and a highest touch input strength,
  wherein in response to a touch input having a highest touch input strength, the controller to apply a first electrical signal having three pulses to the first light source unit, and based on the first electrical signal a first color emitted from the first light source unit is directed to the second light source unit through the light guide; and
  wherein in response to a touch input having the highest touch input strength, the controller to apply a second electrical signal having three pulses to the second light source unit based on the touch input strength, and based on the second electrical signal a second color emitted from the second light source unit is directed to the first light source unit though the light guide.

11. The image display apparatus according to claim 10, wherein the controller controls performance of an operation for switching an image displayed on the display or a volume control operation based on the touch input.

12. The image display apparatus according to claim 10, wherein the input device changes intensity of the third light output from the light guide based on at least one of the position information of the touch input, a number of times of the touch input, a duration of the touch input, a moving distance of the touch input and a strength of the touch input.

13. The image display apparatus according to claim 10, wherein the input device changes at least one of the color of the light output from the first light source unit or the color of the light output from the second light source unit according to at least one of the position information of the touch input, a number of times of the touch input, a duration of the touch input, a moving distance of the touch input or a strength of the touch input.

14. The image display apparatus according to claim 10, wherein the controller controls to perform a setting of time or temperature based on the touch input detected by the touch sensor.

* * * * *